US011616410B2

(12) United States Patent
Takada et al.

(10) Patent No.: US 11,616,410 B2
(45) Date of Patent: Mar. 28, 2023

(54) CLEANER

(71) Applicant: Samsung Electronics Co., Ltd., Suwon-si (KR)

(72) Inventors: Masayuki Takada, Yokohama (JP); Minoru Yoshida, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 17/136,517

(22) Filed: Dec. 29, 2020

(65) Prior Publication Data

US 2021/0218307 A1 Jul. 15, 2021

(51) Int. Cl.
*H02K 3/28* (2006.01)
*A47L 5/28* (2006.01)
*H02K 1/12* (2006.01)

(52) U.S. Cl.
CPC ............. *H02K 3/28* (2013.01); *A47L 5/28* (2013.01); *H02K 1/12* (2013.01)

(58) Field of Classification Search
CPC .. H02K 3/00; H02K 3/02; H02K 3/04; H02K 3/18; H02K 3/28; H02K 3/47; H02K 11/00; H02K 11/38; H02K 7/00; H02K 7/11; H02K 7/116; H02K 7/14; A47L 5/00; A47L 5/28; A47L 5/30; A47L 9/2884
See application file for complete search history.

(56) References Cited

U.S. PATENT DOCUMENTS

| | | | |
|---|---|---|---|
| 5,608,281 A | 3/1997 | Gerling et al. | |
| 2001/0053040 A1* | 12/2001 | Sekine | H05K 1/141 |
| | | | 360/99.23 |
| 2003/0189386 A1* | 10/2003 | Carl | H02K 1/182 |
| | | | 310/254.1 |
| 2019/0058374 A1* | 2/2019 | Enomoto | H02K 9/14 |
| 2019/0140508 A1 | 5/2019 | Masuda | |
| 2019/0334393 A1* | 10/2019 | Kim | H02K 1/14 |

FOREIGN PATENT DOCUMENTS

| | | | |
|---|---|---|---|
| DE | 4232851 A1 | 4/1993 | |
| JP | 2009-072010 A | 4/2009 | |
| JP | 2012-050312 A | 3/2012 | |
| JP | 2012-090410 A | 5/2012 | |
| JP | 2012-518377 A | 8/2012 | |
| JP | 2018078776 * | 5/2018 | ............... H02K 3/18 |
| JP | 2018-125951 A | 8/2018 | |
| JP | 2018-166353 A | 10/2018 | |
| KR | 10-0673456 B1 | 1/2007 | |

OTHER PUBLICATIONS

International Search Report dated May 3, 2021, issued in International Patent Application No. PCT/KR2021/000075.
Extended European Search Report dated Sep. 28, 2022, issued in European Application No. 21738893.3-1202.

\* cited by examiner

*Primary Examiner* — Tran N Nguyen
(74) *Attorney, Agent, or Firm* — Jefferson IP Law, LLP

(57) ABSTRACT

A fan motor of a cleaner capable of exhibiting a high output is provided. The fan motor includes a shroud disposed to cover a fan, a rotor fixed to a shaft, and a stator disposed opposite to the rotor in an axial direction with a predetermined gap therebetween. The stator includes a substrate on which a bearing is installed and a plurality of armatures disposed around the bearing. A coil is formed in such a way that a flat wire having a rectangular cross-section is bent to a short side thereof to be wound around an iron core.

17 Claims, 18 Drawing Sheets

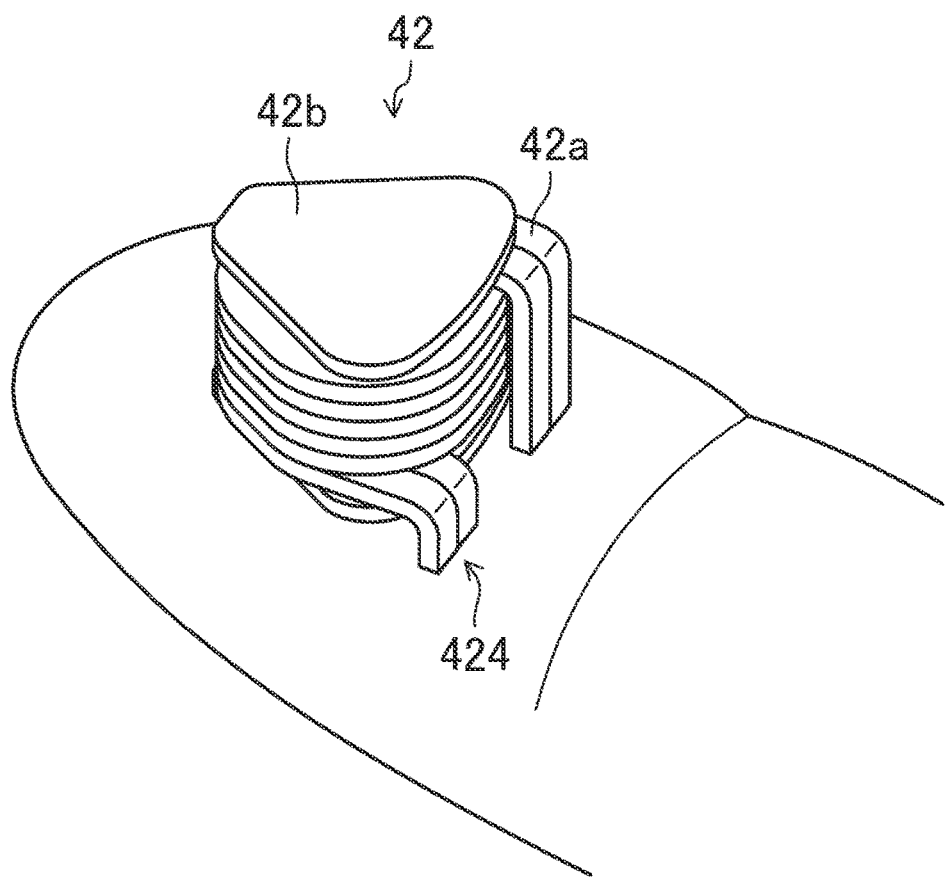

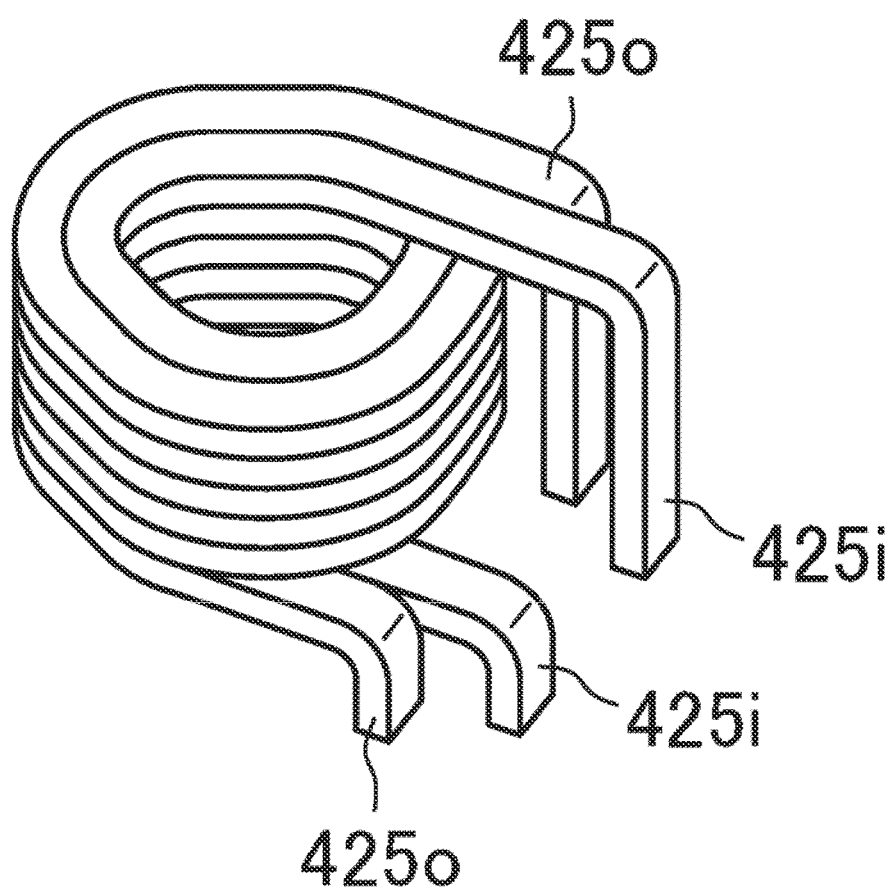

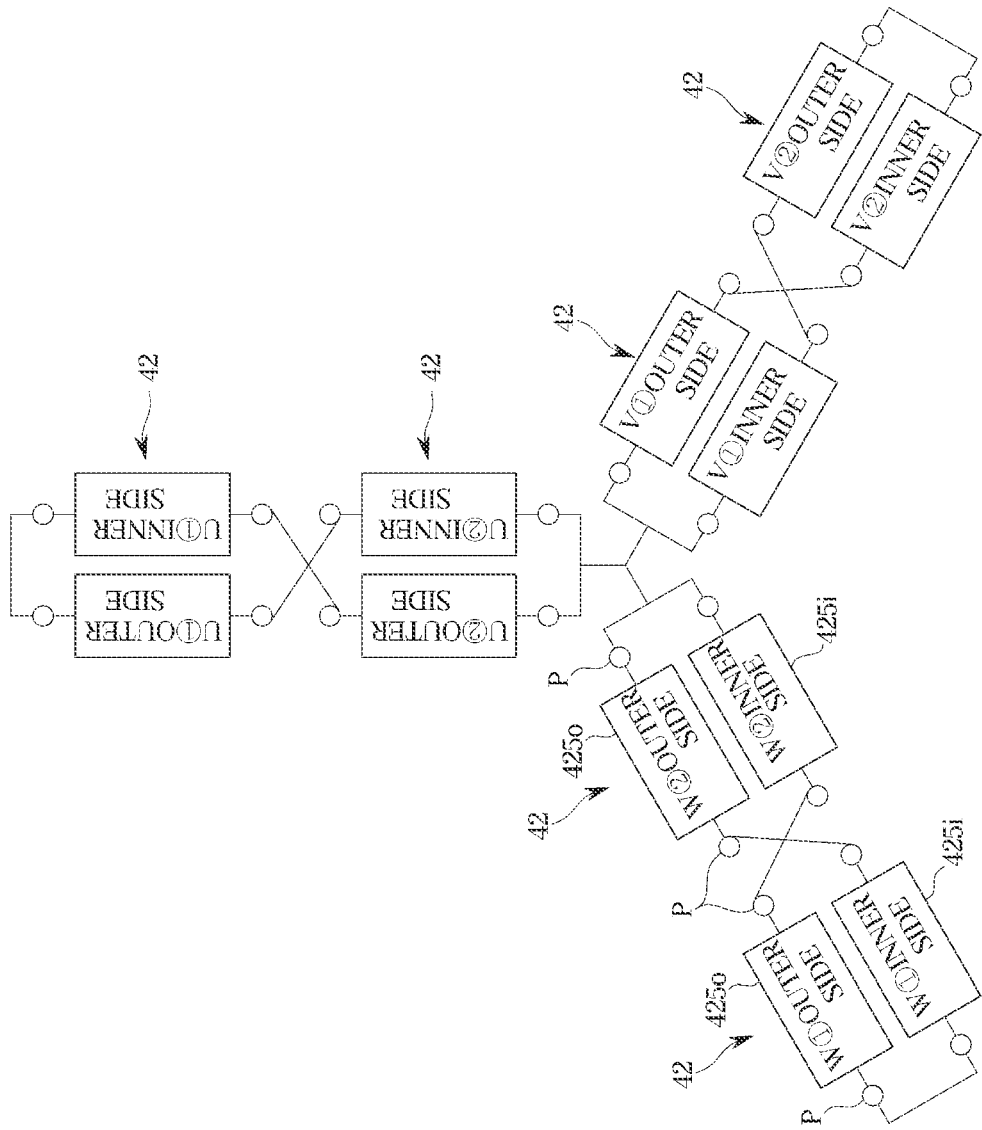

CLEANER

CROSS-REFERENCE TO RELATED APPLICATION(S)

This application is based on and claims priority under 35 U.S.C. § 119(a) of a Korean patent application number 10-2020-0170110, filed on Dec. 8, 2020, in the Korean Intellectual Property Office, of a Japanese patent application number 2020-003079, filed on Jan. 10, 2020, in the Japanese Patent Office, and of a Japanese patent application number 2020-134924, filed on Aug. 7, 2020 in the Japanese Patent Office, the disclosure of each of which are incorporated by reference herein their entireties.

BACKGROUND

1. Field

The disclosure relates to an axial gap type fan motor of a cleaner.

2. Description of Related Art

An axial gap type motor of a cleaner is disclosed in Patent Documents 1 to 3. Patent Document 1 discloses a motor in which three-phase stator coils having U, V, and W phases are composed of an edgewise coil using a flat wire, and are connected in parallel for each phase by Y connection. Patent Document 2 discloses a motor in three-phase stator coils composed of U, V, and W phases are composed of an edgewise coil using a flat wire, and are connected in series for each phase.

The motor of Patent Document 1 is for an electric vehicle or wind power generation, and the motor of Patent Document 2 is for an electric brake of a vehicle.

In the motor of Patent Document 3, a coil is formed using a flat wire formed in such a way that a plurality of bare copper wires having a rectangular cross section is tied and coated. Further, Patent Document 3 discloses that a coil is formed in such a way that a single flat wire is bent to a short side (comparative example 1) and in this case, an eddy current loss increases.

RELATED ART DOCUMENT (Patent Document 1) Japanese Unexamined Patent Application Publication No. 2012-90410.
(Patent Document 2) Japanese Unexamined Patent Application Publication No. 2018-166353.
(Patent Document 3) Japanese Unexamined Patent Application Publication No. 2009-72010.

The above information is presented as background information only to assist with an understanding of the disclosure. No determination has been made, and no assertion is made, as to whether any of the above might be applicable as prior art with regard to the disclosure.

SUMMARY

Recently, a stick-type cleaner in which a cleaner body is omitted has been popular. In general, an electrical cord is also omitted (wireless). Therefore, the stick-type cleaner has excellent operability and convenience.

In the stick type cleaner, a fan motor, which is small and light and configured to be operated for a long time with high power, is required. For example, in response to an outer diameter of the fan motor being greater than 100 mm, unfamiliarity and inconvenience may occur in the use of the stick type cleaner.

Accordingly, there is a need for a high-power fan motor (mini fan motor) having a small outer diameter of 100 mm or less and having a light weight and capable of obtaining sufficient suction power as a cleaner.

In this respect, the motors of Patent Documents 1 to 3 are too large to be applied to a stick type cleaner. Even if such a motor is miniaturized, it is difficult to perform an edgewise winding, and it is difficult to obtain an output suitable for a cleaner.

Aspects of the disclosure are to address at least the above-mentioned problems and/or disadvantages and to provide at least the advantages described below. Accordingly, an aspect of the disclosure is to provide a mini fan motor capable of exhibiting a high output appropriate for a stick type cleaner.

Additional aspects of the disclosure will be set forth in part in the description which follows and, in part, will be apparent from the description, or may be learned by practice of the presented embodiments.

Another aspect of disclosure is to provide an axial gap type fan motor of a cleaner.

In accordance with an aspect of the disclosure, a fan motor is provided. The fan motor includes a fan including a plurality of blades radially installed, and fixed to the shaft extending in an axial direction, a shroud disposed to cover the fan and including a suction port in a center thereof, a rotor including a plurality of magnets forming magnetic poles, and fixed to the shaft, and a stator disposed opposite the rotor in the axial direction with a predetermined gap therebetween. The stator includes a substrate in which a bearing configured to rotatably support the shaft is installed in a central portion thereof and a plurality of armatures including a coil and an iron core disposed around the bearing. The coil is formed in such a way that a flat wire having a rectangular cross section is bent toward a short side thereof and thus the short side of the flat wire is wound in contact with the iron core.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings of which:

FIG. 5A is a schematic perspective view of an armature according to an embodiment of the disclosure;

FIG. 8A is a schematic view illustrating one of application examples according to an embodiment of the disclosure;

FIG. 13 is a wiring diagram between a coil of each phase and a control circuit according to an embodiment of the disclosure.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

First Embodiment

Stick Type Cleaner

Figure 1:
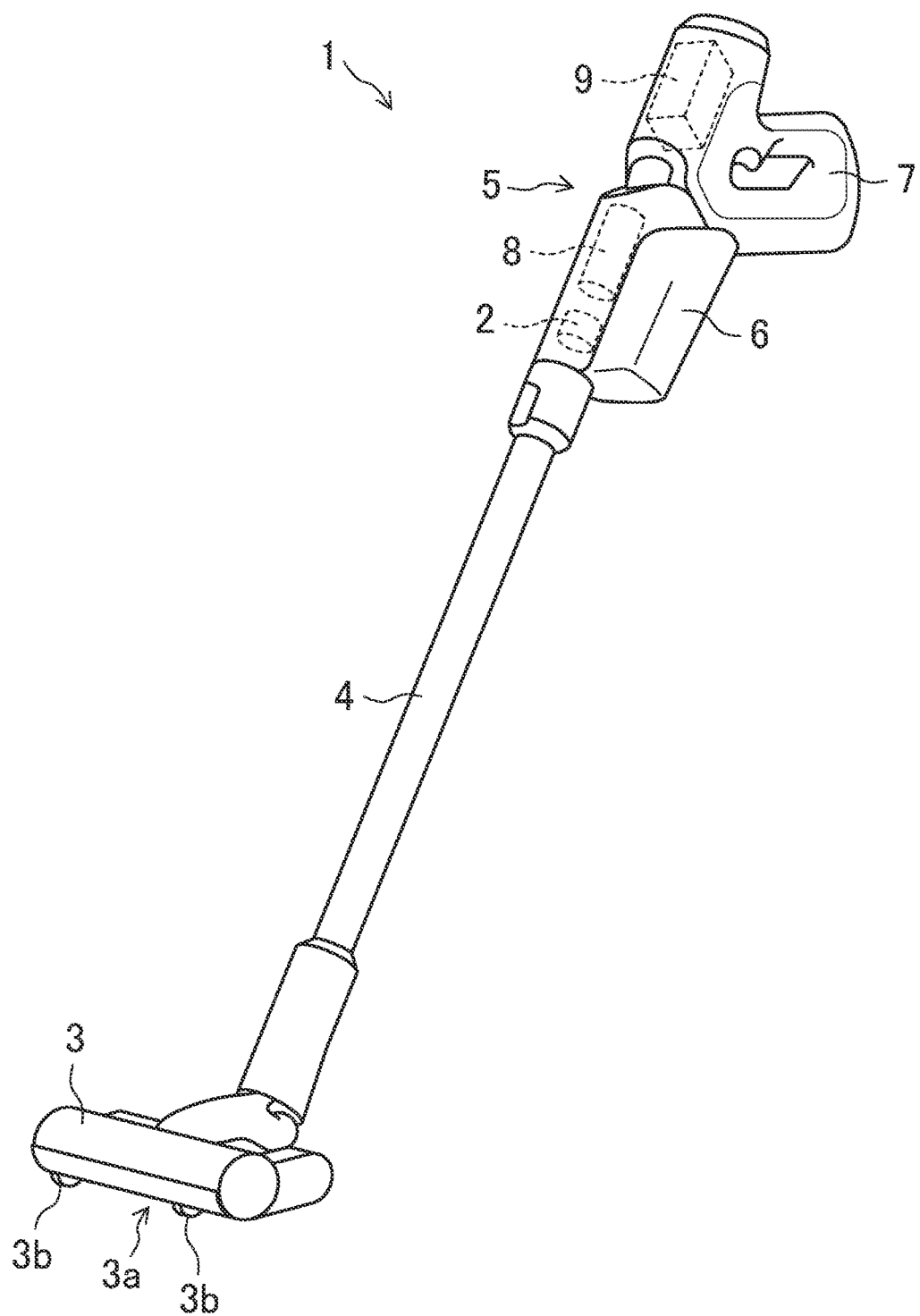
FIG. 1 is a schematic view of a stick type cleaner equipped with a fan motor according to an embodiment of the disclosure.

FIG. 1 illustrates a stick type cleaner suitable for the disclosed techniques according to an embodiment of the disclosure. Referring to FIG. 1, the cleaner 1 is a wireless type, and configured to be driven by electric power from a battery 8 embedded therein.

A fan motor 2 to which the disclosed technology is applied is mounted in the cleaner 1. The cleaner 1 may include a suction portion 3, a pipe portion 4, a body portion 5, a dust case 6, and a handle portion 7.

The suction portion 3 includes a suction port 3a provided on a lower surface thereof, and the suction portion 3 is configured to be slidable along a floor by using a rotatable roller 3b. The pipe portion 4 is formed of an elongated cylindrical member provided to be stretched. A lower end of the pipe portion 4 is connected to the suction portion 3 and an upper end of the pipe portion 4 is connected to the body portion 5. The pipe portion 4 allows the suction port 3a to communicate with the body portion 5.

The body portion 5 is formed to have a size slightly greater than a size of the pipe portion 4. The fan motor 2, the battery 8, a controller 9, and the like are accommodated in the body portion 5. The controller 9 controls driving of the fan motor 2. The battery 8 is a rechargeable secondary battery and supplies electric power to the fan motor 2.

The handle portion 7 is a part held by a user and is provided integrally with the body portion 5. The handle portion 7 is provided to protrude rearward from a rear side of the body portion 5. The cleaner 1 is configured to allow a user to use the cleaner by holding the handle portion 7 with one hand.

The dust case 6 is installed under the handle portion 7. The dust case 6 is configured to be detachable from the body portion 5. The fan motor 2 is disposed adjacent to the dust case 6. The fan motor 2 is driven by power supplied from the battery 8 under the control of the controller 9. In response to the fan motor 2 being driven, a strong suction force is formed. Accordingly, dust sucked from the suction port 3a is collected in the dust case 6 through the pipe portion 4.

Fan Motor 2

Figure 2:
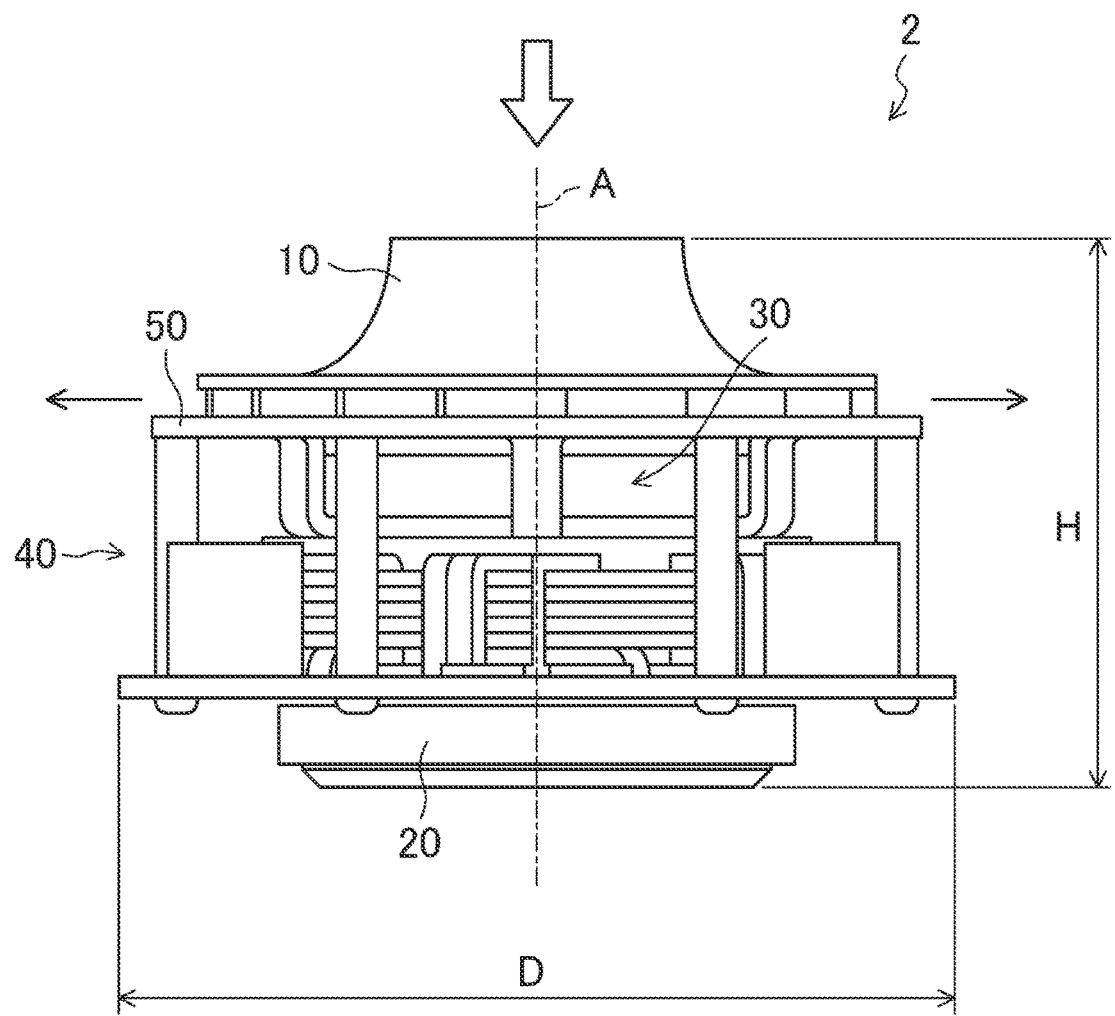
FIG. 2 is a schematic view of a fan motor when viewed from the side according to an embodiment of the disclosure.

FIG. 2 illustrates a fan motor according to an embodiment of the disclosure.

Referring to FIG. 2, the fan motor 2 is a small device in which a fan and a motor are integrated with each other.

A fan is a so-called centrifugal fan, which sucks air to the center of the fan as indicated by a white arrow and discharges the sucked air outward in a radial direction as indicated by a thin arrow.

The motor includes a stator 40 and two rotors 20 and 30 arranged opposite to each other in the axial direction (that is an axial gap type). The rotors 20 and 30 are disposed on opposite sides of the stator 40, respectively.

An outer diameter D and a height H of the fan motor 2 are designed to be very small so as to be accommodated in the body portion 5. For example, as for the fan motor 2, the outer diameter D is about 70 mm, and the height H is about 40 mm (that is a palm size). Therefore, a weight of the fan motor 2 is light and it is not difficult to put the fan motor 2 on the palm of the hand.

Further, the fan motor 2 is configured to obtain high efficiency and high output so as to obtain sufficient performance as the cleaner 1 by using the power of the battery 8. The fan motor 2 may be configured to be rotated at a high speed of 100000 rpm or more with 600 W of power consumption, and configured to obtain a suction power of 300 W or more.

Figure 3:
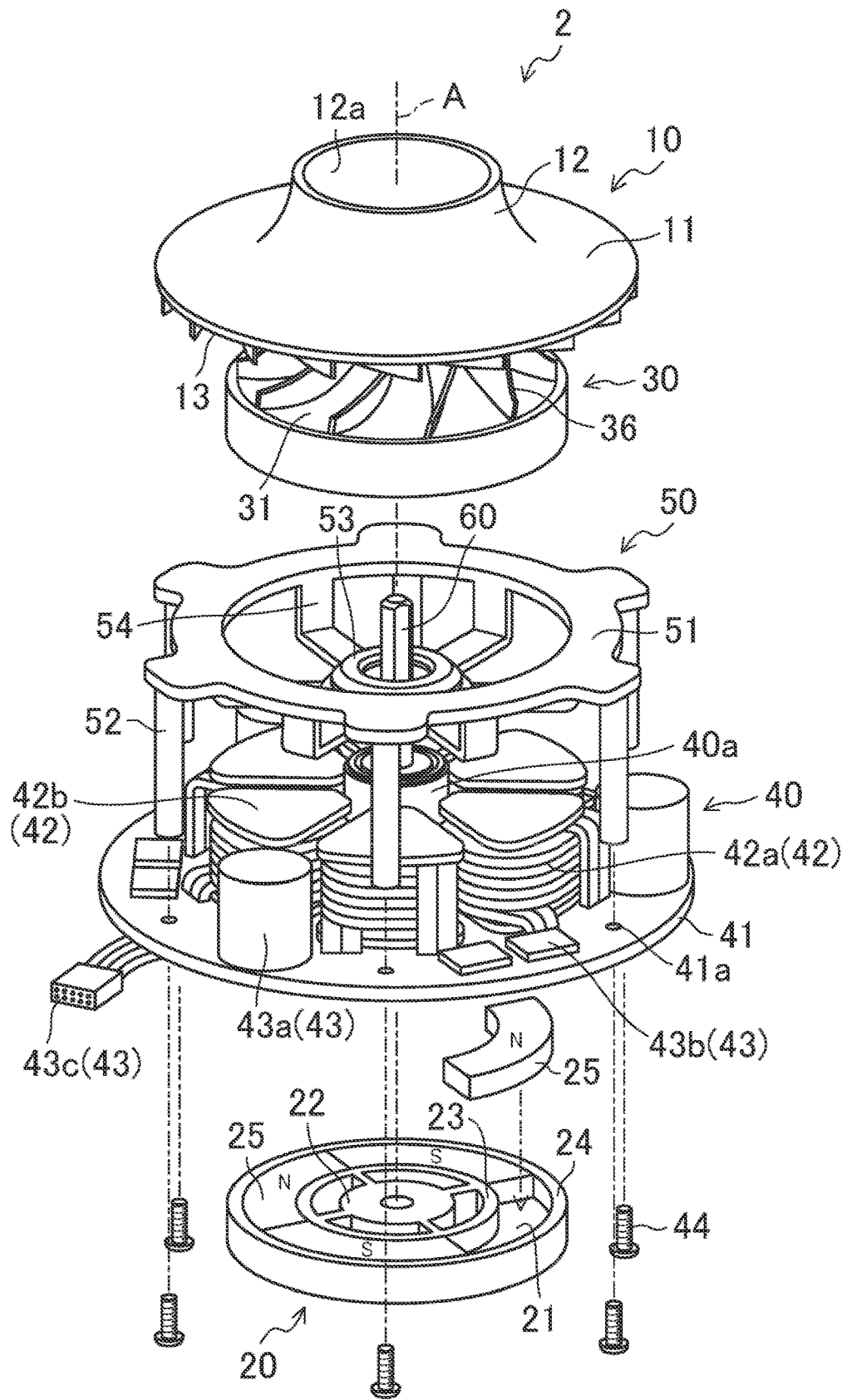
FIG. 3 is an exploded perspective view of a fan motor according to an embodiment of the disclosure.

FIG. 3 illustrates a structure of a fan motor according to an embodiment of the disclosure.

Referring to FIG. 3, the fan motor 2 may include a shroud 10, a first rotor 20, a second rotor 30 and the stator 40, a frame 50, and a shaft 60. The shaft 60 is a rod-shaped member and is provided coaxially with a rotational axis A of the fan motor 2.

Shroud 10

The shroud 10 has a hat-shaped appearance, and includes an annular bottom portion 11 and a funnel portion 12 connected to an inner edge of the bottom portion 11 to protrude so as to allow a diameter thereof to be gradually reduced toward the front. An annular inlet 12a is formed in an upper portion of the funnel portion 12 placed on the center of the shroud 10. A plurality of fins 13 disposed at a distance from each other in a circumferential direction is stood at the rear of the bottom portion 11.

First Rotor 20

The first rotor 20 is formed of a disk-shaped member having an outer diameter less than the outer diameter of the shroud 10 and having a thickness greater than a thickness of the shroud 10. The first rotor 20 includes a base portion 21 having a circular outer circumference, a boss portion 22 protruding from the center of the base portion 21, and an inner peripheral wall portion 23 and an outer peripheral wall portion 24 formed in a cylindrical shape doubly surrounding the boss portion 22. The base portion 21, the boss portion 22, and the peripheral wall portion are integrally formed by a ferromagnetic material such as metal (that is yoke).

A plurality of magnets 25 (four in the drawing) having an arc shape is interposed between the inner peripheral wall portion 23 and the outer peripheral wall portion 24. Each magnet 25 is arranged in such a way that the N pole and the S pole are alternately positioned in the circumferential direction. The magnetic pole of the first rotor 20 is formed by the magnet 25.

Second Rotor 30

The second rotor 30 has substantially the same size and structure as the first rotor 20. That is, like the first rotor 20, the second rotor 30 includes a base portion (represented by a reference numeral 31 for identification), a boss portion 22 in which an insertion hole is opened, an inner peripheral wall portion 23 and an outer peripheral wall portion 24. In the same manner as the first rotor 20, a magnet 25 is interposed between the inner peripheral wall portion 23 and the outer peripheral wall portion 24 (not shown).

Unlike the first rotor 20, the second rotor 30 includes a plurality of blades 36 radially installed on a rear surface of the base portion 31 (a side opposite to a surface to which the magnet 25 is exposed). In other words, the second rotor 30 also serves as a fan.

Frame 50

The frame 50 may include an annular ring frame 51, a plurality of columns 52 (six columns in the drawings), a disk-shaped bearing cover 53, a plurality of arms 54 (six arms in the drawings). The frame 50 supports the shroud 10 and the second rotor 30 at a predetermined position with respect to the stator 40.

Each column 52 is arranged at a predetermined distance in the circumferential direction, and extends in an axial direction from the ring frame 51. The bearing cover 53 is disposed at the center of the ring frame 51 while being disposed away from the ring frame 51 in the axial direction toward the column 52. Each arm 54 is bent and extended radially in an L-shape from the bearing cover 53 and is connected to the inner edge of the ring frame 51.

Stator 40

The stator 40 may include a substrate 41, a plurality of armatures 42 (six armatures in the drawings), and a control circuit.

Figure 4:
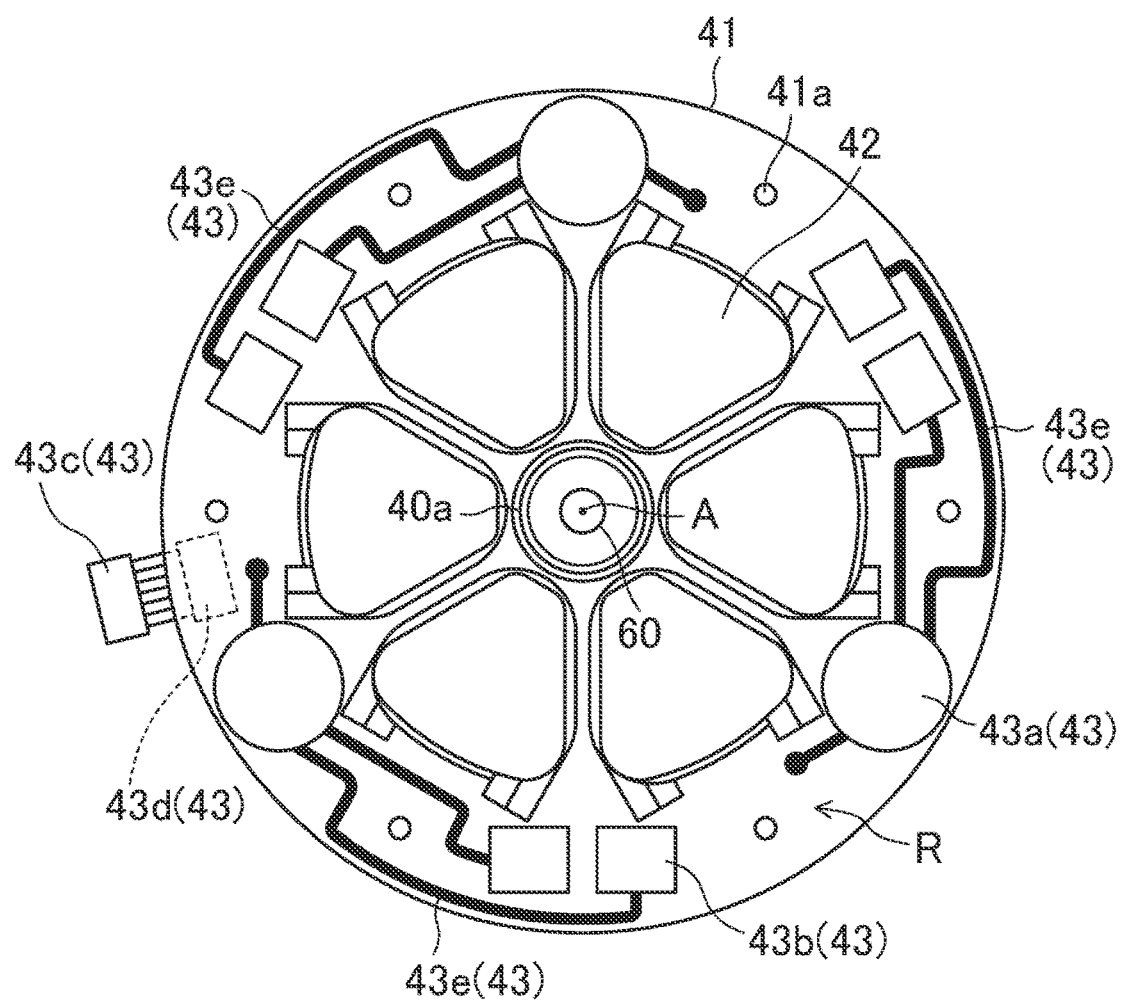
FIG. 4 is a schematic view of a substrate when viewed from the top according to an embodiment of the disclosure.

Referring to FIGS. 2 and 4, the substrate 41 is formed of a disk-shaped member having an outer diameter greater than the outer diameter of the shroud 10. A cylindrical bearing 40a having a bearing therein is provided in a center of a surface of the substrate 41 so as to be covered by the bearing cover 53. The shaft 60 is rotatably supported by the bearing 40a. The shaft 60 extends in the axial direction perpendicular to the substrate 41.

A plurality of screw holes 41a (six screw holes in the drawing) is formed in the outer circumferential portion of the substrate 41. The screw 44 coupled to the screw hole 41a on the rear surface of the substrate 41 is fastened to each lower end of the arm 54, and thus the frame 50 is mounted on the substrate 41. One end of the shaft 60 protrudes from the bearing cover 53 configured to cover the bearing 40a, and the other end of the shaft 60 protrudes from the rear surface of the substrate 41.

The armature 42 includes a coil 42a and an iron core 42b. Each armature 42 is arranged in the circumferential direction in a state of being densely arranged around the bearing 40a (details of the armature 42 will be described later).

FIG. 4 is a schematic view of a substrate when viewed from the top according to an embodiment of the disclosure.

Referring to FIG. 4, the substrate 41 is formed of an insulating material, and a control circuit 43 is provided on the substrate 41. The control circuit 43 includes electric components, such as a capacitor 43a and an element 43b, and the control circuit 43 is configured to control energization to the coil 42a of the armature 42. The control circuit 43 is disposed in an annular region (annular region R) radially outward from the each armature 42 on the substrate 41. The annular region R has a relatively large area and thus even if there are many electric components, the electric components may be arranged in the annular region R without difficulty.

The control circuit 43 includes a terminal portion 43d including a cable 43c to which a connector is attached. The cable 43c is used for connection with the controller 9. The control circuit 43 also includes a wiring pattern 43e formed of a conductor and provided to extend along the substrate 41.

Although not shown, as an end of the coil 42a of the armature 42 is fitted into the substrate 41, the coil 42a is connected to the wiring pattern 43e. Further, the control circuit 43 is connected to the terminal portion 43d through the wiring pattern 43e. That is, in the stator 40, an electric wire 424 is not used for connecting the electric components or the coil 42a. The electric components or the coil 42a are connected through the wiring pattern 43e formed in the substrate 41, and thus manufacturing is easier and the structure is also simplified.

Because the wiring pattern 43e is formed with a margin in the annular region R, defects, such as a short circuit or disconnection may be suppressed. Particularly, because a high current is supplied to the coil 42a in the motor, the wiring pattern 43e requires a large cross-sectional area. In the annular region R, the wiring pattern 43e having the large cross-sectional area may be formed with a margin.

One end of the shaft 60 protruding from the bearing cover 53 is press-fitted into the insertion hole of the boss portion 22 of the second rotor 30 from the exposed side of the magnet 25. The other end of the shaft 60 protruding from the rear surface of the substrate 41 is press-fitted into the insertion hole of the boss portion 22 of the first rotor 20 from the exposed side of the magnet 25.

Accordingly, the first rotor 20 is disposed opposite to the stator 40 in the axial direction with a predetermined gap therebetween. The second rotor 30 is accommodated in a space surrounded by the bearing cover 53, each arm 54, and the ring frame 51, and thus the second rotor 30 is also disposed opposite to the stator 40 in the axial direction with a predetermined gap therebetween.

Particularly, the magnets 25 of the first rotor 20 and the second rotor 30 are provided to axially face the armature 42 group provided in each stator 40.

More particularly, each magnet 25 of the second rotor 30 is provided to directly and axially face the armature 42 group provided in the stator 40. In contrast, each of the magnets 25 of the first rotor 20 is provided to axially face the armature 42 group provided on the stator 40 with the substrate 41 interposed therebetween.

In addition, each magnet 25 of the first rotor 20 and the second rotor 30 is provided not to axially face the annular region R (the control circuit 43 provided in the stator 40).

That is, each magnet 25 of the first rotor 20 and the second rotor 30 is provided to axially face only the armature 42 group, but the each magnet 25 is provided not to face the control circuit 43 or the wiring pattern 43e. Therefore, it is possible to suppress the occurrence of eddy current loss and thus it is possible to allow the motor to be higher efficient.

The shroud 10 is fixed to the frame 50 while covering the second rotor 30 in a state in which the rear surface of the bottom portion 11 on which the fin 13 is stood is directed to the ring frame 51. Accordingly, a centrifugal fan is formed by the shroud 10 and the second rotor 30 configured to serve as a fan. At this time, the centrifugal fan is described as an example, but a mixed flow fan may be used.

Armature 42

FIG. 5A is a schematic perspective view of an armature according to an embodiment of the disclosure.

Referring to FIG. 5A, the armature 42 is composed of fine components provided to be put on a fingertip, as enlarged in FIG. 5A. Because the armature 42 has such a fine size, materials and shapes thereof have been studied in order to realize a high-efficiency and high-output motor.

In order for the motor to have high output, it is required to generate a strong magnetic force by supplying a current as high as possible to the coil 42a. In order to allow a high current to flow through the coil 42a, a thick wire is appropriate and in order to generate a strong magnetic force with high efficiency, it is appropriate to provide the iron core 42b in the coil 42a or to increase the fill factor.

Figure 5B:
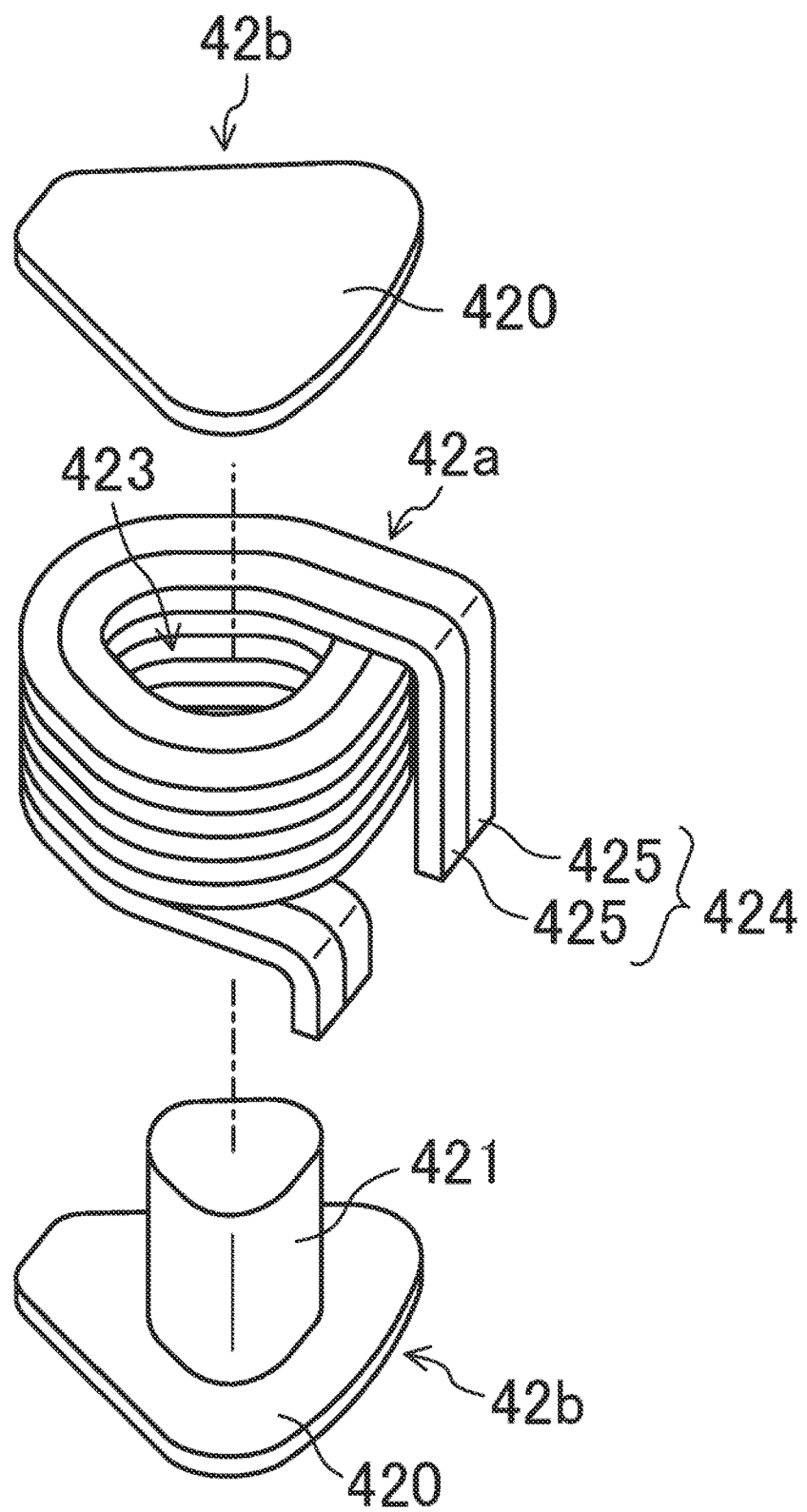
FIG. 5B is an exploded perspective view of an armature according to an embodiment of the disclosure.

FIG. 5B is an exploded perspective view of an armature according to an embodiment of the disclosure.

Referring to FIG. 5B, the armature 42 includes the coil 42a and the iron core 42b. The iron core 42b is formed by compression molding iron powder or the like, and includes a pair of flange portions 420 and 420 and a winding portion 421. Each flange portion 420 is a plate-shaped portion and is formed in a substantially fan shape with rounded corners.

Figure 11A:
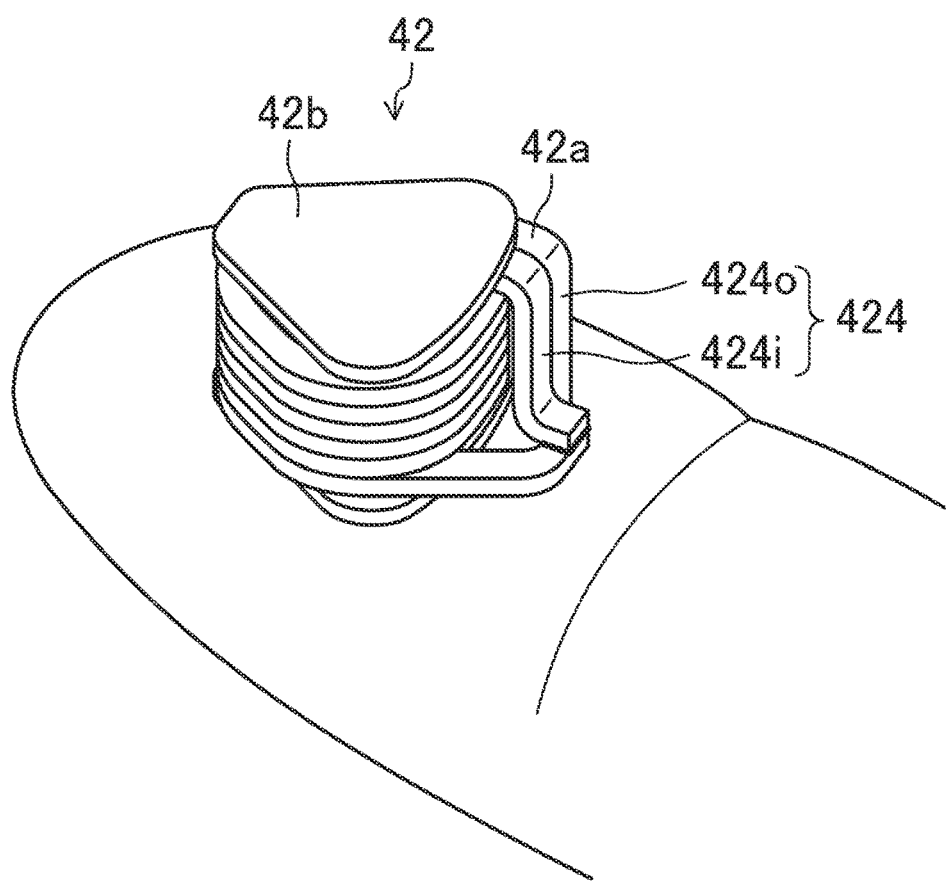
FIG. 11A is a schematic perspective view of an armature according to an embodiment of the disclosure.
Figure 11B:
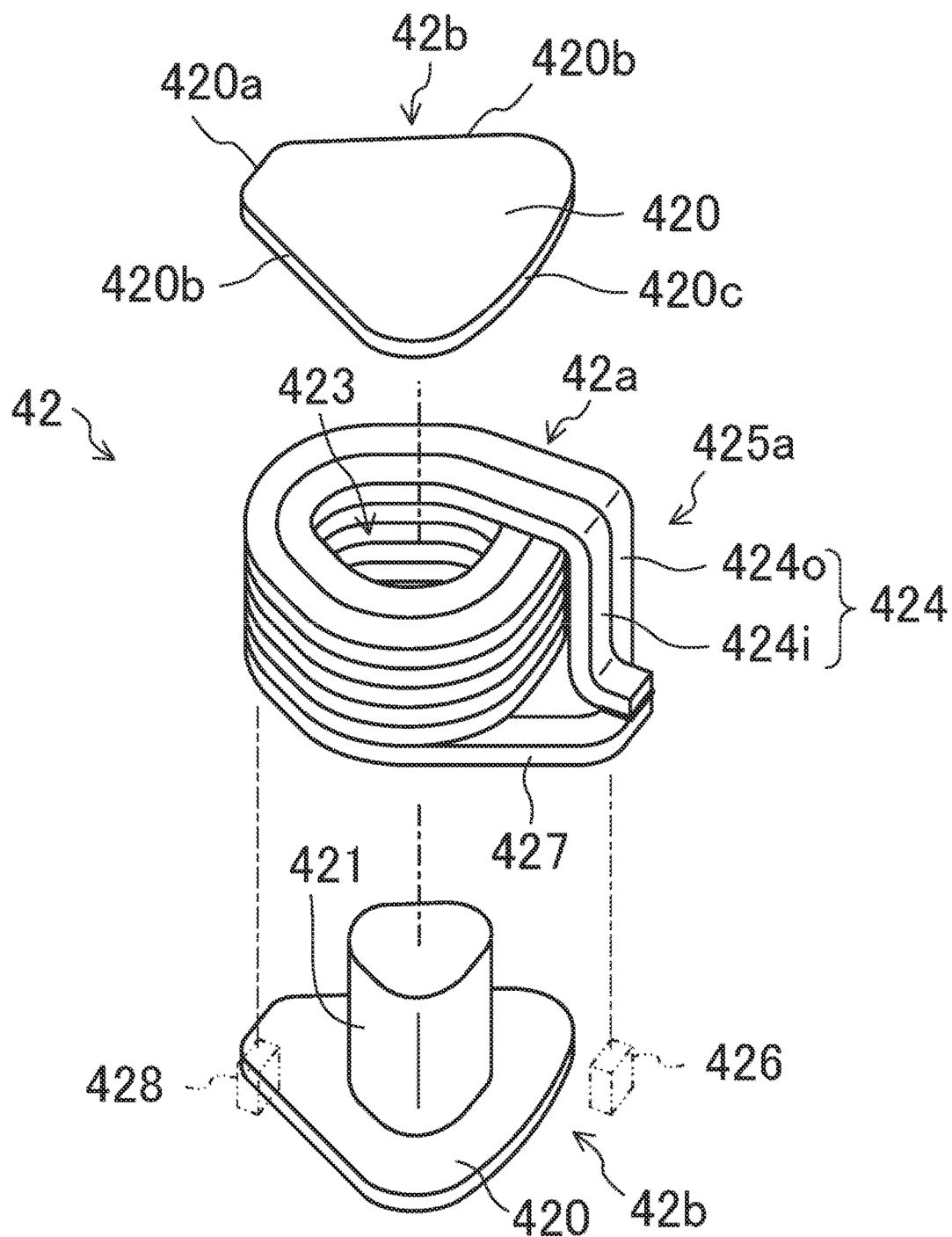
FIG. 11B is an exploded perspective view of an armature according to an embodiment of the disclosure.

More particularly, the flange portion 420 includes an apex portion 420a having a narrow shape, a pair of opposite side portion 420b and 420b extending from the apex portion 420a to be spaced apart from each other, and a bottom side portion 420c curved and connected to the opposite side portions 420b and 420b (refer to FIG. 11B).

The winding portion 421 is a columnar portion extending perpendicular to the flange portion 420 and has a substantially equilateral triangle cross-section with rounded corners. The winding portion 421 is stood in a central portion of the flange portion 420 on one side. Each iron core 42b is disposed on the substrate 41 in such a way that the apex portion 420a of the flange portion 420 faces the bearing 40a.

The coil 42a having a predetermined shape is formed in advance and then the coil 42a is mounted to the iron core 42b, thereby forming the armature 42. That is, the coil 42a is provided with an insertion hole 423 having a substantially triangular cross-section slightly larger than the winding portion 421, and the winding portion 421 is fitted into the insertion hole 423. Further, the flange portion 420 on the other side is mounted to the end of the winding portion 421 protruding from the insertion hole 423, thereby forming the armature 42.

Figure 6A:
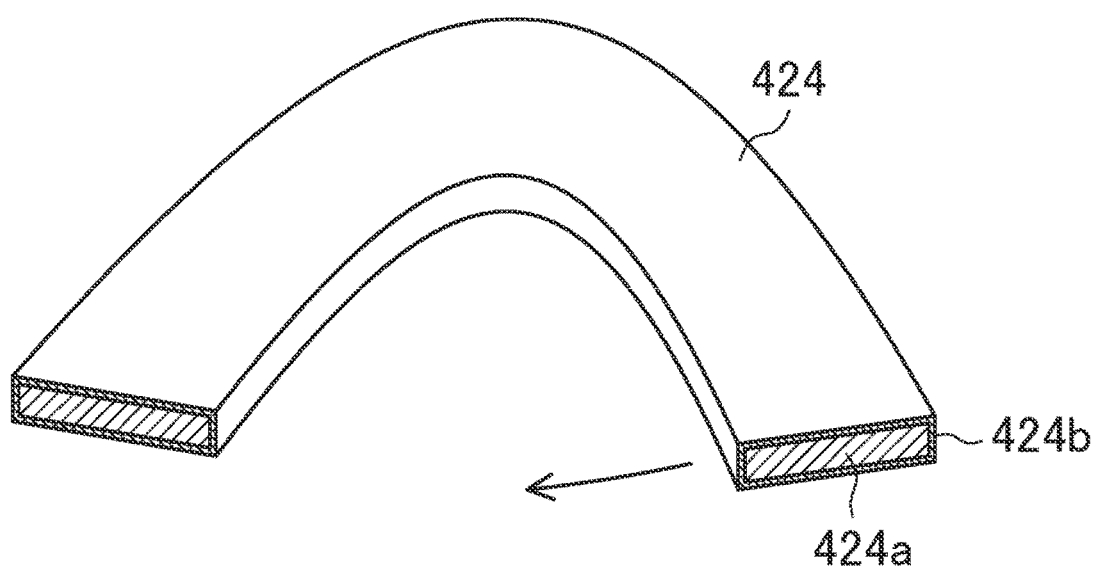
FIG. 6A is a view illustrating an edgewise winding according to an embodiment of the disclosure.

FIG. 6A is a view illustrating an edgewise winding according to an embodiment of the disclosure.

Referring to FIG. 6A, the coil 42a is formed by winding the electric wire 424 formed by covering an electric conductor 424a such as copper with an insulating film 424b. In the motor, a flat wire having a rectangular cross-section is used as the electric wire 424. As indicated by an arrow in FIG. 6A, the coil 42a is formed by bending the flat wire toward a short side thereof (that is an edgewise winding).

Because the flat wire is stacked without a gap, the flat wire may have higher fill factor than a round wire. Further, as for the edgewise winding, the short side having a small thickness is stacked, and thus it is possible to reduce a size of the coil 42a in a winding direction (the axial direction). Even if the short side is small, a cross-sectional area of the flat wire may be increased by increasing a long side that is, the electric wire 424 may be formed to be thick.

However, as for the fan motor 2, the coil 42a has an ultra-mini size as described above. Therefore, it is required to wind the flat wire having a large cross section around the iron core 42b having a very small size. In contrast, in the armature 42, the coil 42a formed in a predetermined winding shape in advance is mounted to the iron core 42b. Therefore, it is not required to wind the flat wire having a large cross section around the iron core 42b having a very small size with the edgewise winding method that is difficult to bend. Therefore, the manufacturing is easier.

In addition, a bending R of the flat wire (a limit value of a bending radius that can guarantee quality) is ¾ or more of a line width in a bending direction. Therefore, in response to bending the flat wire, which has a large long side, to fit the cross-sectional shape of the very small winding portion 421, the limit of the bending R is exceeded. Therefore, there may be a risk that the insulating film 424b is torn or the conductor wire is damaged, and thus it is difficult to ensure proper quality.

Therefore, in the fan motor 2, the flat wire (the electric wire 424) is composed of two or more flat wire element 425 extending to close a short side thereof in a parallel state. In the same manner as the end of the flat wire, an end of each flat wire element 425 is connected to the wiring pattern 43e (parallel connection).

Figure 6B:
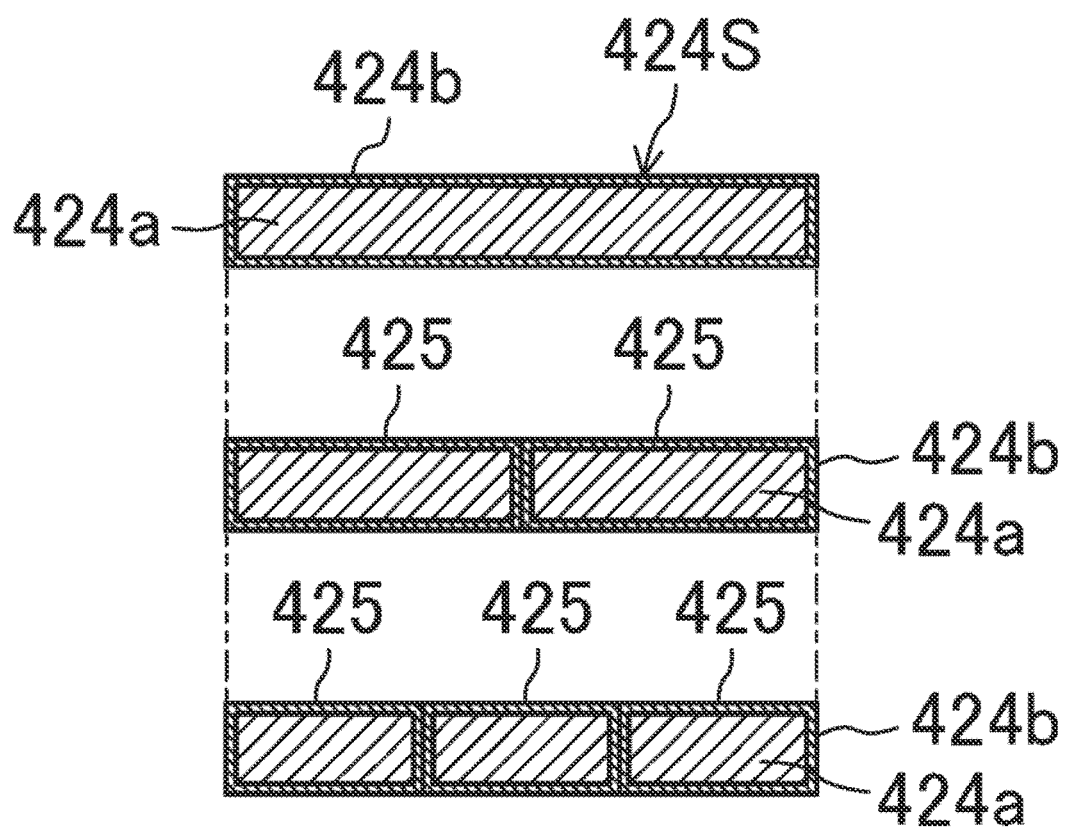
FIG. 6B is a view illustrating a flat wire element according to an embodiment of the disclosure.

FIG. 6B illustrates an example thereof according to an embodiment of the disclosure.

Referring to FIG. 6B, it is assumed that the fan motor 2 requires a flat wire (a reference flat wire 424S) of the size, as illustrated in an upper part of FIG. 6. At a middle part of FIG. 6B, a case, in which the reference flat wire 424S is formed with two flat wire elements 425 and 425, is illustrated. In a lower part of FIG. 6B, a case, in which the reference flat wire 424S is formed with three flat wire elements 425, 425 and 425, is illustrated. A structure of the flat wire element 425 is the same as the flat wire (the electric wire 424).

A length of the short side in the cross section of each flat wire element 425 is the same as that of the reference flat wire 424S. On the other hand, in the cross section of each flat wire element 425, a length (line width) of the long side is substantially the same as a length obtained by dividing the long side of the reference flat wire 424S by the number of the flat wire element 425 (although there is a difference by a thickness of the insulating film 424b, the difference is small). Therefore, the sum total of the cross-sectional area of the electrical conductor 424a of each flat wire element 425 is substantially the same as a cross-sectional area of the electrical conductor 424a of the reference flat wire 424S.

As mentioned above, by forming the flat wire with the plurality of flat wire elements 425, the line width in the bending direction becomes the line width of the individual flat wire elements 425, and thus the bending R may be reduced. Accordingly, while maintaining a large cross-sectional area of the electric conductor 424a, it is possible to bend the flat wire element 425 to fit the very small cross-sectional shape of the winding portion 421.

The number of flat wire elements 425 may be appropriately selected according to the specification. In the fan motor 2, the configuration (two flat wire elements 425) illustrated in the middle part of FIG. 6B is adopted. In response to three or more flat wire elements 425, it is difficult to allow the short sides to come into close contact with each other in a parallel state, but in response to two flat wire elements 425, it is possible to allow the short sides to come into close contact with each other in the parallel state, relatively easily. That is, the manufacturing is easier.

As described above, in the fan motor 2, because the coil 42a is formed by the flat wire (the electric wire 424) with the edgewise winding, the fill factor may be increased while allowing the coil 42a to be small in the axial direction. Because the iron core 42b is provided in the armature 42, it is possible to generate a strong magnetic force with high efficiency.

Because the flat wire (the electric wire 424) is composed of the plurality of flat wire elements 425 extending in a state in which the short sides thereof come into close contact with each other in the parallel state, it is possible to reduce the bending R and it is possible to wind the electric wire 424 including the electric conductor 424a having a large cross-section area around the very small winding portion 421. Therefore, it is possible to reduce the current density and thus it is possible to allow a high current to stably and efficiently flow.

Because the coil 42a, which is wound in a predetermined shape in advance, is mounted to the iron core 42b, it is possible to easily manufacture the armature 42.

APPLICATION EXAMPLE

Figure 7:
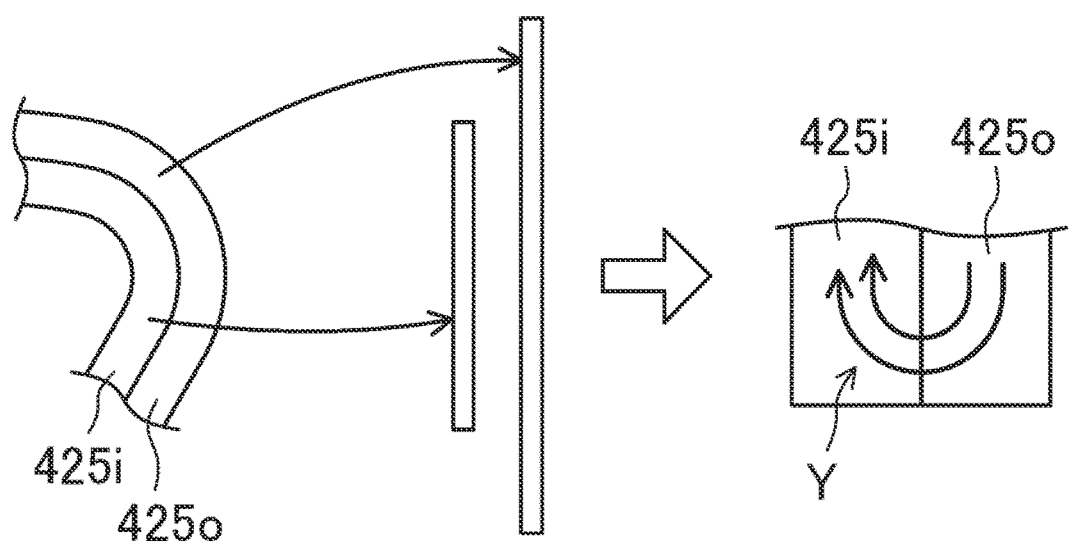
FIG. 7 is a view illustrating an application example according to an embodiment of the disclosure.

FIG. 7 is a view illustrating an application example of the first according to an embodiment of the disclosure.

Referring to FIG. 7, the flat wire element 425 which is located on an outside of the bending direction (indicated by reference numeral 425o) is longer than the flat wire element 425 which is located on an inside of the bending direction (indicated by reference numeral 425i) due to an arrangement. As the line width is increased, a difference in the length may occur as much as the increased line width.

In response to a difference in the length of the flat wire elements 425i and 425o, an electrical resistance may differ. In response to a difference in the electrical resistance of the flat wire elements 425i and 425o, a potential difference occurs, and a circulating current flows between ends of the flat wire elements 425i and 425o, that is a portion in which the insulating film covering each of the ends is peel off and thus a conductor is exposed (a part connected to the same terminal), as indicated by an arrow Y in FIG. 7. As the difference in the length increases, the loss due to the circulating current increases and thus it may affect the motor output.

Therefore, in this case, it is appropriate to allow electric resistance values of each flat wire element 425 to be approximately the same.

FIG. 8A is a schematic view illustrating one of the application examples according to an embodiment of the disclosure.

Referring to FIG. 8A, the ends of the flat wire elements 425 may be arranged to be spaced apart from each other. Particularly, the flat wire element 425o and the flat wire element 425i are arranged at a different position in such a way that, in comparison with the flat wire element 425o which is located on the outside of the bending direction, the flat wire element 425i, which is located on the inside of the bending direction, is located on the outer circumference side with respect to the bending center.

Accordingly, it is possible to allow the length of each of the flat wire elements 425i and 425o to be approximately same. In response to the length being approximately the same, the value of the electric resistance becomes approximately the same, and thus it is possible to suppress the circulating current. Therefore, it is possible to maintain the high output of the motor.

Figure 8B:
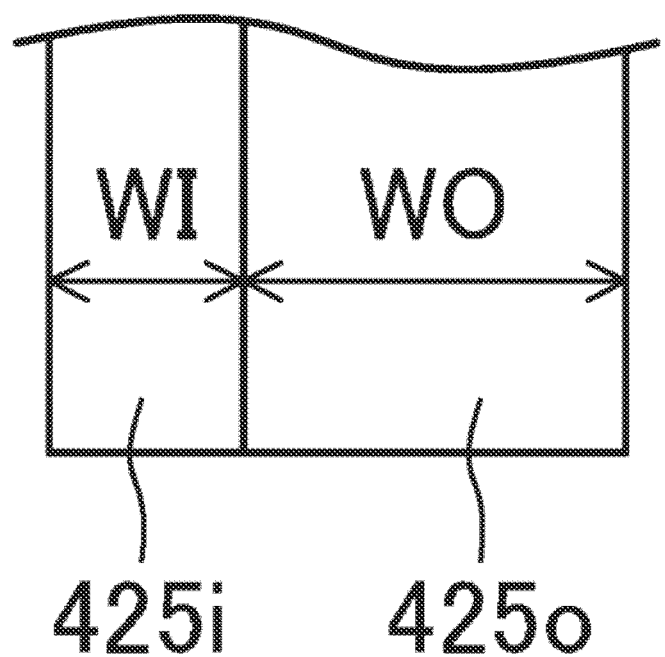
FIG. 8B is a schematic view illustrating another of application examples according to an embodiment of the disclosure.

FIG. 8B is a schematic view illustrating another of application examples according to an embodiment of the disclosure.

Referring to FIG. 8B, widths WI and WO of the flat wire elements 425i and 425o may be different from each other, referring to FIG. 8B. Even in this case, the resistance values of each of the flat wire elements 425i and 425o may be substantially the same. Because the positions of the ends are the same, there is an advantage in terms of arrangement.

As mentioned above, the flat wire may include three or more flat wire elements.

Second Embodiment

Figure 9:
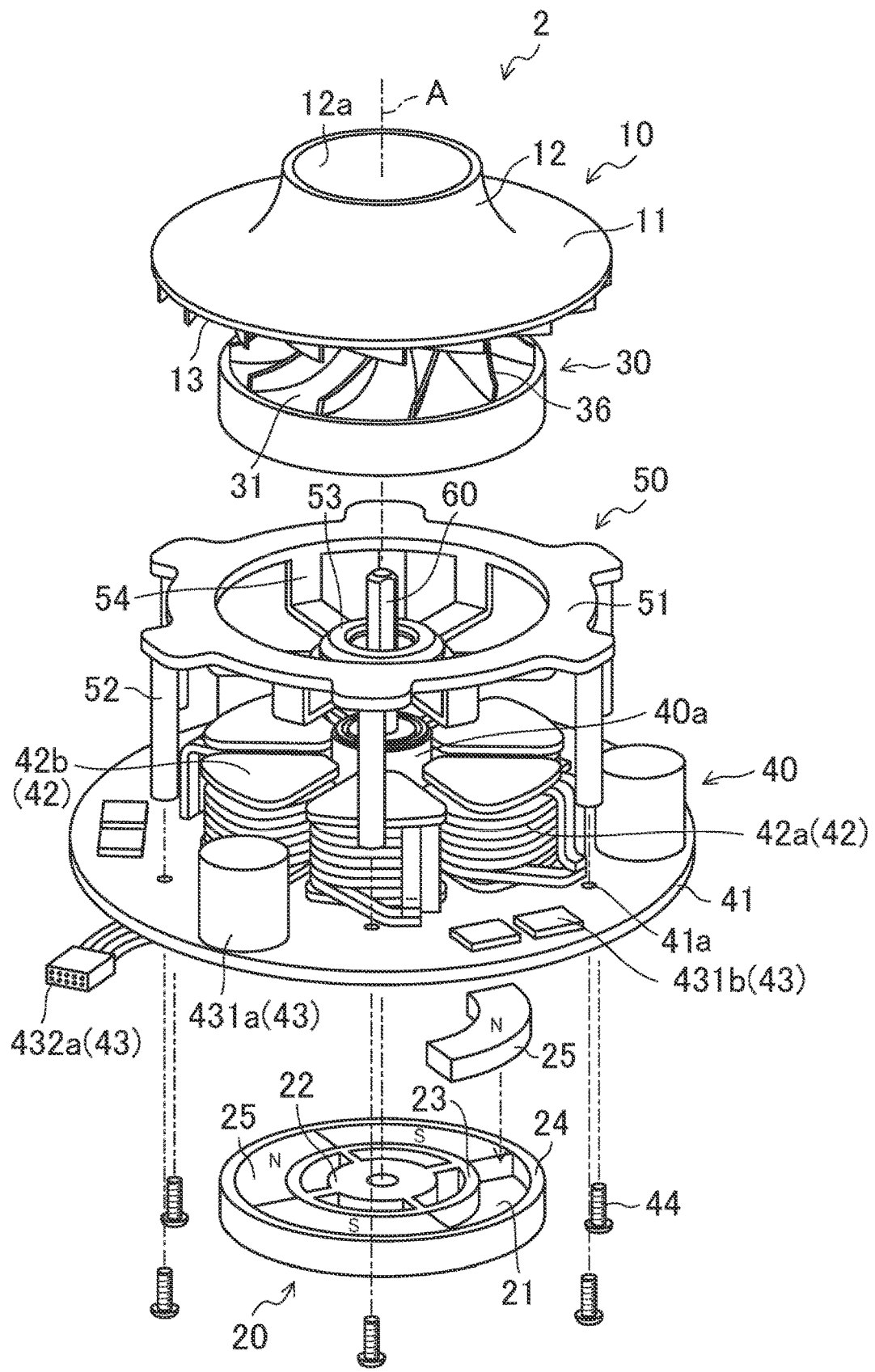
FIG. 9 is an exploded perspective view of a fan motor according an embodiment of the disclosure.

FIG. 9 illustrates a fan motor according to an embodiment of the disclosure.

Referring to FIG. 9, the basic configuration of the fan motor 2 according to the second embodiment is the same as that of the first embodiment. That is, in the second embodiment, the basic configuration is the same as that described in the first embodiment. Therefore, the contents peculiar to the second embodiment that are not described in the first embodiment will be described.

Substrate

Figure 10:
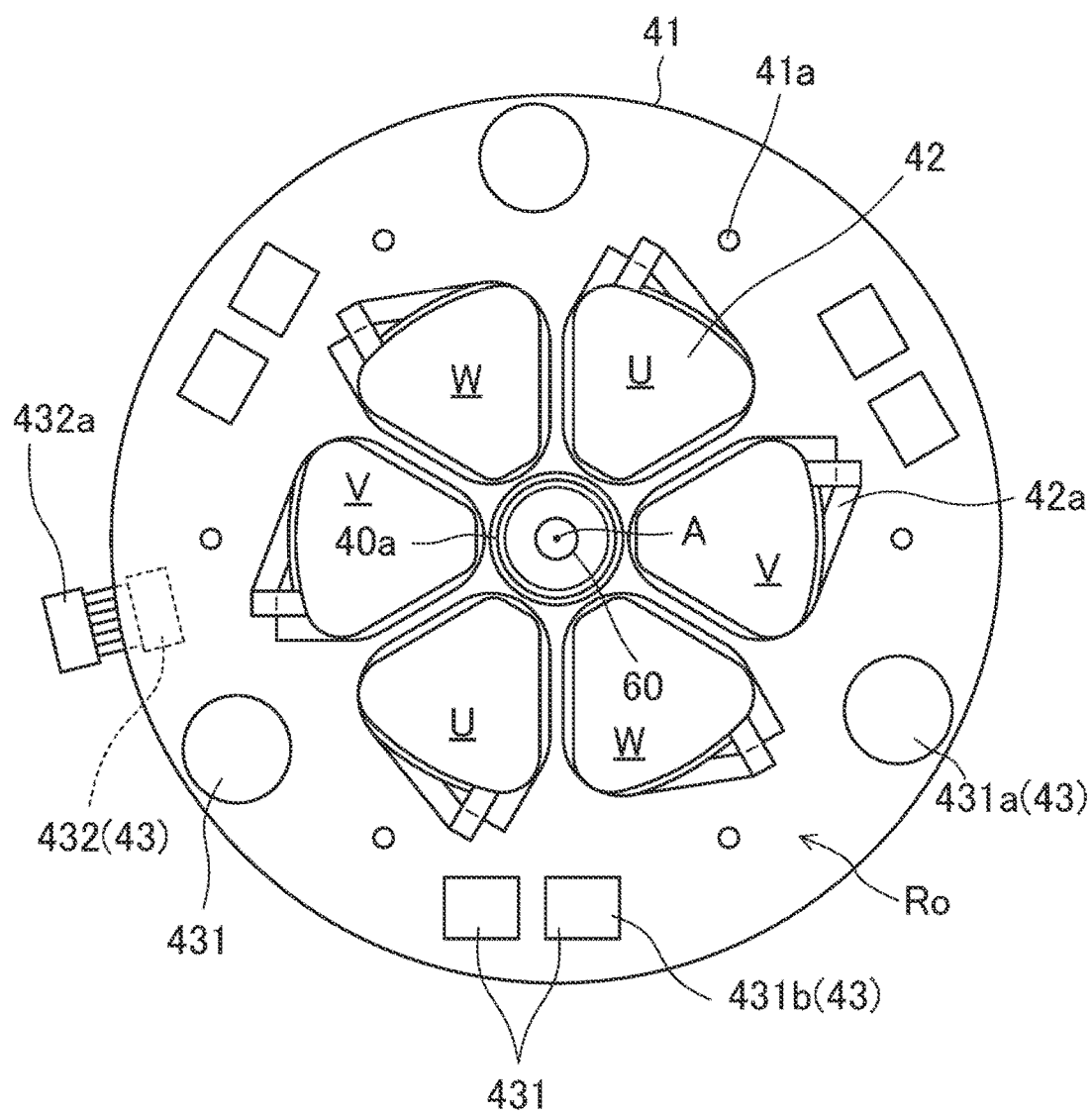
FIG. 10 is a schematic view of a substrate when viewed from the top according to an embodiment of the disclosure.

FIG. 10 is a schematic view of a substrate when viewed from the top according to an embodiment of the disclosure.

Referring to FIG. 10, a substrate 41 is a multilayer printed circuit board, and a main body of the substrate 41 is composed of a plurality of laminated insulating plates. An electric wiring circuit (that is a wiring pattern) is provided by placing an electric conductor such as, copper foil formed in a predetermined shape between the plates.

In the same manner as the first embodiment, a control circuit 43 includes a control electric component (control component 431) such as a capacitor 431a and a switching element 431b. The control component 431 controls energization to each armature 42. The control circuit 43 also includes a terminal portion 432 including a cable 432a to which a connector is attached. The cable 432a is used for connection with the controller 9.

The control component 431, the terminal portion 432, the coil 42a of each armature 42, and the like are electrically connected through a wiring pattern. Therefore, because the cable or the like requiring soldering is sufficiently omitted, manufacturing cost may be reduced and quality may be improved. Particularly, dense wiring with thick cables is required because the high current flows in the fan motor 2, and thus it is effective. In the case of a wiring pattern, because it is possible to increase a thickness and width of the copper foil, it is appropriate for the fan motor 2.

Each armature 42 forms a coil group composed of three phases of U phase, V phase and W phase. In the fan motor 2, the coil group of each phase is composed of a pair of coils 42a and 42a, and armatures 42 positioned in a point-symmetric shape form a coil group of the same phase.

Three sets of control components 431 are provided for each phase, and the phase of the current flowing through the coil group of each phase is different. Accordingly, the fan motor 2 is rotated by the action of magnetic force generated between the respective armatures 42 and the magnets 25 of the first rotor 20 and second rotor 30.

In the same manner as the first embodiment, the control component 431 is disposed in an annular region (outer annular region Ro) radially outward from each armature 42 on the substrate 41. The control component 431 is provided on opposite sides of the outer annular region Ro.

In addition, in the fan motor 2 according to the embodiment, the substrate 41 and the control circuit 43 along with the armature 42 have been studied so as to improve the miniaturization and weight reduction, high efficiency, and high output.

FIG. 11A is a schematic perspective view of an armature according to an embodiment of the disclosure.

Referring to FIG. 11A, in the fan motor 2, the flat wire (the electric wire 424) is composed of the pair of flat wires extending in such a way that the short sides thereof come into close contact with the inside and outside in the parallel state. In other words, the flat wire includes an outer element line 424o and an inner element line 424i that are in close contact with each other and extend in a parallel state in the winding direction.

In response to forming the flat wire by being divided into two, a line width in the bending direction becomes half, and thus the bending R may be reduced. Accordingly, while maintaining a large cross-sectional area of the electric conductor, it is possible to bend the flat wire to fit the cross-sectional shape of the very small winding portion 421.

As described above, in the fan motor 2, the coil 42a is formed by winding the flat wire (the electric wire 424) in the edgewise winding method. Therefore, it is possible to increase the fill factor while allowing the coil 42a to be small in the axial direction. The iron core 42b is provided in the armature 42 and thus it is possible to generate a strong magnetic force with high efficiency.

Because the flat wire (the electric wire 424) is composed of two flat wires having a small line width in the bending direction, it is possible to reduce the bending R and it is possible to wind the flat wire (the electric wire 424), in which the cross-sectional area of the electric conductor is large, around the relatively very small winding portion 421. Therefore, it is possible to reduce the current density and thus it is possible to allow the high current to flow efficiently and stably.

Because the coil 42a, which is wound in a predetermined shape in advance, is mounted to the iron core 42b, it is possible to easily manufacture the armature 42.

Research of Coil

In each coil 42a, one end of the outer element line 424o is directly connected to the other end of the inner element line 424i. Referring to FIGS. 11A and 11B, when it is assumed that the coil 42a is wound from an upper end, the outer element line 424o and the inner element line 424i include a vertically extending protrusion 425a extending from the end, on which the winding starts, to the side, on which the winding ends, along the outer circumferential surface of the coil 42a. The vertically extending protrusion 425a is located near one corner of the bottom side portion 420c of the flange portion 420.

An end of the vertically extending protrusion 425a of the outer element line 424o is located outside the flange portion 420 and protrudes downward (outer connection end 426), as shown by a two point chain line in FIG. 11B. In contrast, an end of the vertically extending protrusion 425a of the inner element line 424i is located above the flange portion 420.

On the other hand, in the vicinity of the other corner of the bottom side portion 420c of the flange portion 420, the end of the outer element line 424o on the side, on which the winding ends, extends in such a way that the winding direction is toward the end of the vertically extending protrusion 425a of the inner element line 424i (horizontally extending protrusion 427). Further, an electric conductor at the end of the horizontally extending protrusion 427 and an electric conductor at the end of the vertically extending protruding portion 425a of the inner element line 424i are connected by welding or the like. As a result, a single coil 42a included in each armature 42 is composed of an outer element coil and inner element coil connected in series with each other.

In a typical case, the ends thereof are soldered at a predetermined position on the substrate 41 and then connected through a wiring pattern of the substrate 41. On the other hand, in the fan motor 2, because the coil 42a itself is connected, the number of connections point of the substrate 41 may be reduced. As a result, the substrate 41 may be further downsized. The quality is improved as the soldering work is reduced.

Because there is a difference in length between the inner element line 424i and the outer element line 424o, a potential difference occurs in response to the current flowing therethrough. When the respective ends of the inner element line 424i and the outer element line 424o are electrically connected to the substrate 41 at close positions, a circulating current is generated between the ends caused by the potential difference. On the other hand, the generation of the circulating current may also be prevented by connecting in this way.

FIG. 11B is an exploded perspective view of an armature according to an embodiment of the disclosure.

Referring to FIG. 11B, the end of the inner element line 424i on the side, on which the winding ends, is bent downward near the apex portion 420a of the flange portion 420. Accordingly, as shown by the two point chain line in FIG. 11B, the end thereof is positioned outside the flange portion 420 and protrudes downward (inner connection end 428). The outer connection end 426 and the inner connection end 428 are respectively connected to the wiring pattern provided on the substrate 41.

Research of Substrate and Control Circuit

Figure 12A:
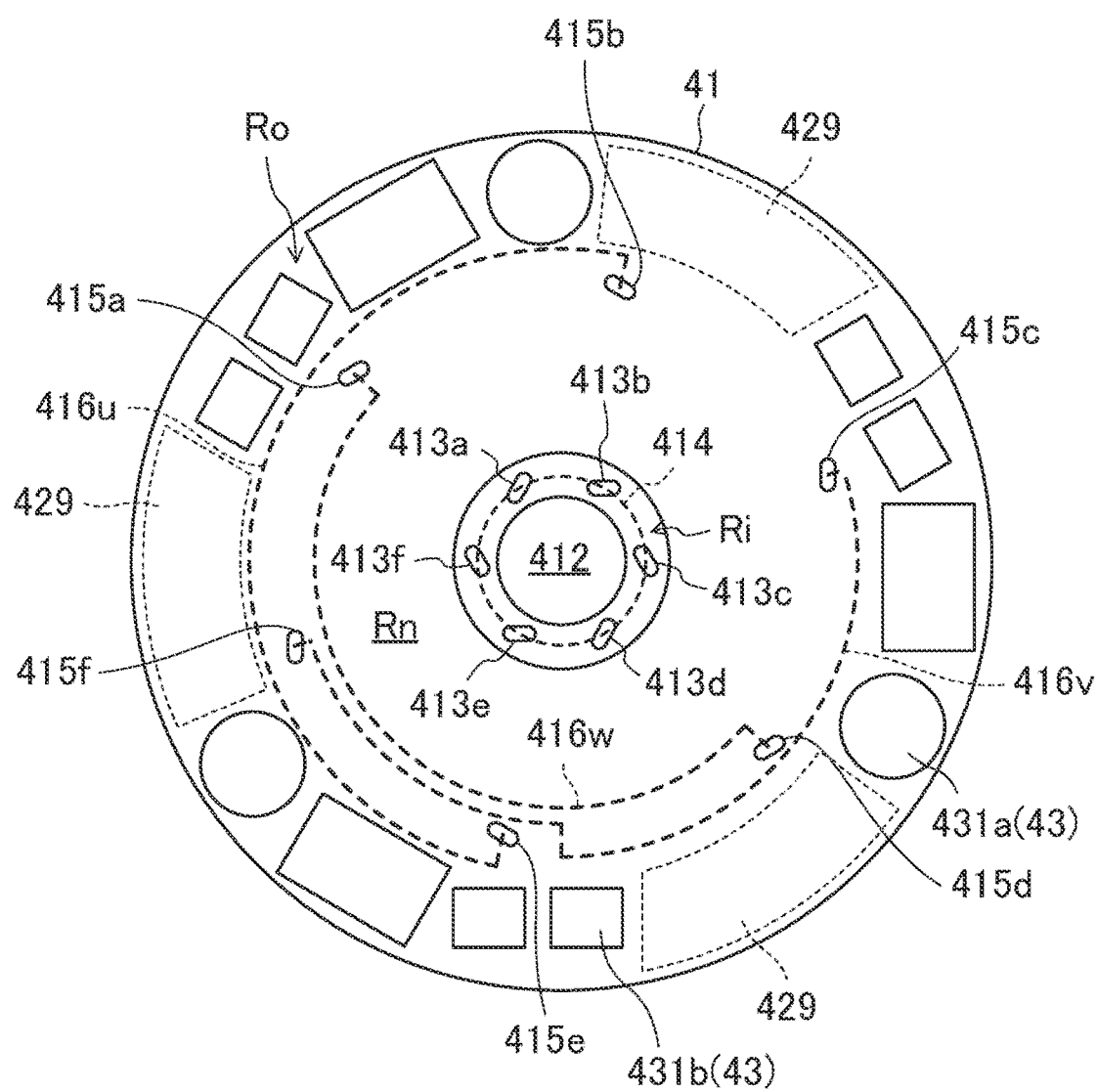
FIG. 12A is a schematic view of a substrate, with which an armature is not provided, when viewed from the top according to an embodiment of the disclosure.
Figure 12B:
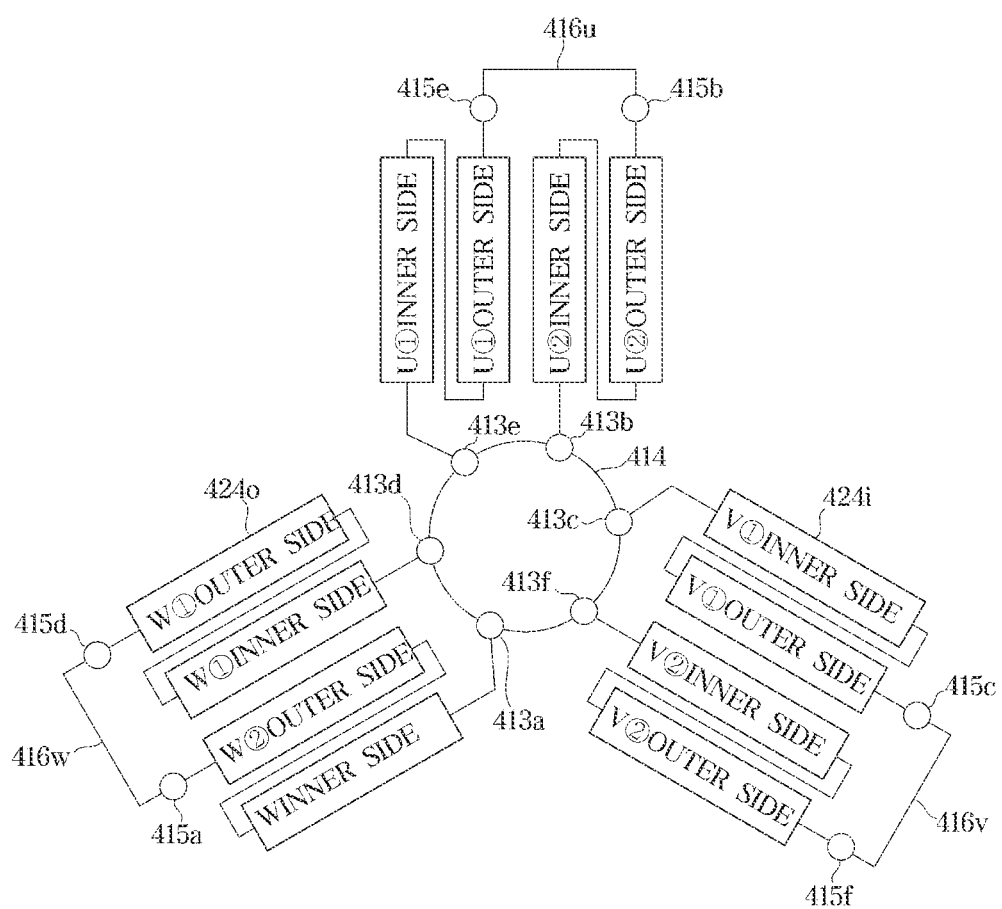
FIG. 12B is a wiring diagram between a coil of each phase and a control circuit according to an embodiment of the disclosure.

FIGS. 12A and 12B illustrate the substrate and the control circuit according to various embodiments of the disclosure.

Referring to FIG. 12A, FIG. 12A illustrates the substrate 41 before the armature 42 is mounted. Referring to FIG. 12B, FIG. 12B illustrates a wiring structure of the outer element line 424o, the inner element line 424i, and the control circuit 43.

Referring to FIG. 12A, a through hole 412 in which the bearing 40a is installed is formed in the center of the substrate 41. Further, around the through hole 412, an annular region (inner annular region Ri) positioned radially inward from the each armature 42 of the substrate 41 is provided.

In the inner annular region Ri, six internal contact points arranged at a regular distance along the circumferential direction are provided (first to sixth internal contact points 413a to 413f). Further, in the inner annular region Ri, an annular wiring pattern (neutral point pattern 414) is provided. Each of the internal contact points 413a to 413f are electrically connected to each other through the neutral point pattern 414.

In addition, six external contact points arranged at a regular distance along the circumferential direction are also provided at the inner circumferential edge portion of the outer annular region Ro (first to sixth external contact points 415a to 415f). Further, three arc-shaped wiring patterns (relay patterns 416u to 416w) are provided at the inner circumferential edge portion of the outer annular region Ro.

Three pairs of external contact points (a first external contact point 415a and a fourth external contact point 415d, a second external contact point 415b and a fifth external contact point 415e, and a third external contact point 415c and a sixth external contact point 415f) positioned in point symmetry with each other are electrically connected to each other through corresponding relay patterns 416u to 416w. Although not shown, the relay patterns 416u to 416w are electrically connected to the control component 431 corresponding to each phase through the wiring pattern so as to energize the coil 42a of each phase.

In addition, the inner connection end 428 is soldered to the inner contact points 413a to 413f, respectively, and the outer connection end 426 is soldered to the outer contact points 415a to 415f, respectively, to mount the each armature 42 to the substrate 41.

Referring to FIG. 12B, among the coils 42a of the each armature 42, the pair of coils 42a and 42a forming the same phase coil group are connected in parallel between the neutral point pattern 414 and the relay pattern 416u to 416w. The neutral point pattern 414 forms a neutral point by electrically connecting one end of the coil group of each phase to each other.

The relay patterns 416u to 416w form a relay point by electrically connecting the other end of the coil group of each phase to the control component 431 corresponding to each phase. Accordingly, the coil group of each phase is in a so-called Y connection (star connection) state.

As mentioned above, as the neutral point is arranged in the inner annular region Ri and the relay point is arranged in the outer annular region Ro, a region (no pattern region Rn), in which the wiring pattern is not placed, is formed between the inner annular region Ri and the outer annular region Ro in the substrate 41. The armature 42 is provided in the no pattern region Rn.

In a state in which the wiring pattern is placed in the region, in response to the motor being driven, an eddy current is generated because magnetic flux passes through the wiring pattern. On the other hand, because the no pattern region Rn is formed in the fan motor 2, it is possible to effectively suppress the generation of eddy current. Accordingly, the motor efficiency and the motor output are improved.

In addition, the wiring pattern may be efficiently arranged on the substrate 41, and the control circuit 43 may be configured compactly. Only the neutral point pattern 414 and the internal contact points 413a to 413f are provided in the inner annular region Ri, and thus the neutral point pattern 414 and the internal contact points 413a to 413f are sufficiently and effectively arranged in the center of the substrate 41 even in a small region.

On the other hand, in the outer annular region Ro, not only the relay patterns 416u to 416w but also other wiring patterns or the plurality of control components 431 are installed. Therefore, a large region is required, and the outer annular region Ro has a relatively large area. Accordingly, even if the control components 431 are large or there are many control components 431, it is possible to arrange the control components 431 without difficulty. Further, it is easy to electrically connect the control component 431 to external devices, and thus it is possible to effectively perform the wiring.

In response to the substrate 41 being small, a region occupied by the control component 431 is relatively enlarged. Particularly, because the switching element 431b becomes high temperature in response to the motor being driven, the substrate 41 also tends to become high temperature. In response to the substrate 41 at high temperature, there may be a risk that the control components 431 or the wiring pattern other than the switching element 431b may be damaged.

Accordingly, in the fan motor 2, the temperature rise of the substrate 41 may be suppressed by using a space remained due to the reduction of the control circuit 43 according to the above-described research. That is, a heat dissipation portion formed of a beta pattern 429 is provided at a predetermined position in the outer annular region Ro.

Particularly, as shown in FIG. 12A, in the outer annular region Ro, copper foil (beta pattern 429) spreads out almost all over the plurality of regions, in which the control component 431 or the wiring pattern of is not provided, without a gap. Unlike the wiring patterns, the beta pattern 429 is not electrically connected to the control component 431 or the like. Each beta pattern 429 is an independent pattern that is not energized.

Because the beta pattern 429 has better heat transfer than the plate, the heat dissipation may be effectively performed though the beta pattern 429 in response to a temperature of the substrate 41 being increased. Therefore, even when the control components 431 that become high temperature are concentrated in the small substrate 41, the temperature increase of the substrate 41 may be suppressed.

FIG. 13 is a wiring diagram between a coil of each phase and a control circuit according to an embodiment of the disclosure.

Referring to FIG. 13, FIG. 13 illustrates a wiring diagram according to the first embodiment using the armature 42 shown in FIG. 5A.

In this case, the two ends of the flat wire element 425o positioned on the outside and the two ends of the flat wire element 425i positioned on the inside are soldered to predetermined positions on the substrate (a predetermined position of a region corresponding to the outer annular region Ro), thereby being connected to the control circuit 43.

Among the same-phase armatures 42, the flat wire element 425i of the armatures 42 on one side, is connected to the flat wire element 425o of the armatures 42 on the other side. By wiring in this way, the difference in the lengths of the inside and the outside of the individual armature 42 may be offset. Therefore, the loss caused by the circulating current may be suppressed. In this case, the contact point p may be located in a region corresponding to the inner annular region Ri. The position of the contact p may be selected according to the specifications.

In addition, the fan motor according to the disclosed technology is not limited to the above-described embodiment, and includes various configurations other than the above-mentioned configuration.

An applicable cleaner is not limited to the stick type. For example, it is also applicable for robot cleaners. It is appropriate that two rotors are provided, but a single rotor may be provided. One side of the rotor may be substituted with a magnetic material such as a steel plate.

Features of the Technology Disclosed in Each Embodiment

First Embodiment

The fan motor includes a fan including a plurality of blades radially installed, and fixed to a shaft extending in an axial direction, a shroud disposed to cover the fan and including a suction port in the center thereof, a rotor including a plurality of magnets forming magnetic poles, and fixed to the shaft, and a stator disposed opposite to the rotor in the axial direction with a predetermined gap therebetween.

The stator includes the substrate on which a bearing configured to rotatably support the shaft is installed in a central portion thereof and a plurality of armatures including a coil and an iron core disposed around the bearing. The coil is formed in such a way that the flat wire having a rectangular cross section is bent toward a short side thereof and thus the short side of the flat wire is wound in contact with the iron core.

That is, in the fan motor, the centrifugal fan and the axial gap type fan motor are integrally formed. The stator forming the motor includes the substrate on which the bearing configured to rotatably support the shaft is installed in the central portion thereof and the plurality of armatures is disposed around the bearing. The plurality of armatures is composed of the coil and the iron core, and the coil is formed in such a way that the flat wire having a rectangular cross section is bent toward a short side thereof, that is the edgewise winding.

Because the flat wire is stacked without a gap, the flat wire may have higher fill factor than a round wire. Further, as for the edgewise winding, the short side having a small thickness is stacked, and thus it is possible to reduce a size of the coil in the winding direction (the axial direction). Even if the short side is small, a cross-sectional area of the flat wire may be increased by increasing a long side that is, the electric wire may be formed to be thick. Therefore, it is possible to realize the fan motor configured to exhibit a high output.

The fan motor may include the winding portion including the iron core extending in the axial direction and including a substantially triangular cross-section including rounded corner portions. The flat wire may be wound around the winding portion.

Accordingly, each armature may be intensively arranged in the center of the substrate in a more compact state. Therefore, the size of the fan motor may be made smaller.

The fan motor may include two or more flat wire elements extending in such a way that the short sides thereof come into close contact with each other in a parallel state.

As for the fan motor, the coil has an ultra-mini size. Therefore, it is required to wind the flat wire having a large cross section around the iron core having a very small size. However, a bending R of the flat wire (a limit value of a bending radius that can guarantee quality) is ¾ or more of a line width in a bending direction. Therefore, in response to that the flat wire having a large long side is bent to fit the very small iron core, the limit of the bending R is exceeded. Therefore, there may be a risk that the insulating film is torn or the conductor wire is damaged, and thus it is difficult to ensure the proper quality of the coil.

By forming the flat wire with the plurality of flat wire elements, the line width in the bending direction becomes the line width of the individual flat wire elements, and thus the bending R may be reduced. Accordingly, while maintaining a large cross-sectional area of the electric conductor, it is possible to greatly bend the flat wire element. Therefore, it is possible to realize the fan motor capable of lowering the current density of the coil and exhibiting the high output.

The fan motor may be provided in such a way that ends of the flat wire elements are arranged at positions apart from each other.

Although details will be described later, there is a risk that a circulating current flows due to a difference in electric resistance of each flat wire element, thereby affecting the motor output. On the other hand, in response to the ends of the flat wire elements being arranged at positions apart from each other, the difference in electric resistance of each flat wire element may be made substantially the same, thereby suppressing the circulating current. Therefore, it is possible to maintain the high output of the motor.

Particularly, the lengths of each of the flat wire elements may be approximately the same.

The fan motor may be provided in such a way that widths of each of the flat wire elements are different from each other.

In this case, the resistance value of each flat wire element may be made almost the same. Therefore, it is possible to maintain the high output of the motor.

The fan motor may further include a control circuit configured to control energization of the stator to the coil, and the control circuit may be disposed in a region of the substrate disposed radially outward from the armature.

Accordingly, because the rotor faces the armature group in the axial direction, the rotor does not face the control circuit. Therefore, the occurrence of eddy current loss may be suppressed, and thus the motor may be further improved in efficiency. In addition, in the case of the outer region in the radial direction, because an area thereof is large, the control circuit may be arranged with a margin.

In this case, it is appropriate that the coil and the control circuit are connected through the wiring pattern provided on the substrate.

Accordingly, because the wire is unnecessary, the manufacturing is easier and the structure is also simplified.

Second Embodiment

The fan motor includes a fan including a plurality of blades radially installed, and fixed to a shaft extending in an axial direction, a shroud disposed to cover the fan and including a suction port in the center thereof, a rotor including a plurality of magnets forming magnetic poles, and fixed to the shaft, and a stator disposed opposite to the rotor in the axial direction with a predetermined gap therebetween.

The stator includes a substrate on which a bearing configured to rotatably support the shaft is installed in a central portion thereof and a plurality of armatures including a coil and an iron core disposed around the bearing. The coil is formed in such a way that the flat wire having a rectangular cross section is bent toward a short side thereof and thus the short side of the flat wire is wound in contact with the iron core. The flat wire is composed of the pair of outer element line and inner element line that are in close contact with the inside and outside, and extend in a parallel state in the winding direction. As one end of the outer element line is connected to the other end of inner element line, the coil is composed of an outer element coil and inner element coil connected in series with each other.

That is, the coil provided in the armature of the fan motor is formed by an edgewise winding. Therefore, it is possible to obtain a high fill factor while suppressing an increase in the height. The flat wire is composed of the pair of outer element line and inner element line. Accordingly, because the line width in the bending direction is reduced, the bending R may be reduced, and thus it is possible to obtain the stable quality even in the small coil.

Further, as one end of the outer element line is connected to the other end of inner element line, the coil is composed of an outer element coil and inner element coil connected in series with each other. The circulating current may be generated between the coils due to the generation of a potential difference, but the circulating current may also be prevented by connecting in this way.

One end of the outer element line may be directly connected to the other end of the inner element line.

Accordingly, the number of connection points on the substrate may be reduced. As a result, the substrate may be further downsized. It is possible to improve the quality because the soldering work is reduced.

Each armature includes a plurality of coil groups having different phase current and the coil forming the same-phase coil group may be connected in parallel by connecting the other end of the outer element line to one end of the inner element line.

Accordingly, the wiring of the control circuit may be simplified. Therefore, the substrate may be further downsized.

The stator includes the control component configured to control energization to the coil group, and the control component may be disposed in a region outside the armature in a radial direction of the substrate.

Because the region has a relatively large area, even if the control components are large or there are many control components, it is possible to arrange the control components without difficulty. Further, it is easy to electrically connect the control component to external devices, and thus it is possible to effectively perform the wiring. Therefore, the substrate may be further downsized.

Each of the control component and the coil group may be connected through the wiring pattern provided on the substrate.

Accordingly, because cables to be soldered are greatly omitted, manufacturing cost may be reduced and quality may be improved. Particularly, dense wiring with thick cables is required because the high current flows in the fan motor and thus it is effective. In the case of a wiring pattern, it is possible to increase the thickness or width of the copper foil and thus it is suitable for a fan motor.

Each of the coil groups is Y-connected, and the neutral point connecting each of the coil groups may be disposed in an inner region than the armature in the substrate in the radial direction.

Accordingly, a region, in which the wiring pattern is not placed, is formed in an armature installation region of the substrate. In a state in which the wiring pattern is placed in this region, an eddy current is generated because the magnetic flux passes through the wiring pattern in response to the motor being driven. However, because there is no wiring pattern, the generation of the eddy current may be effectively suppressed. Accordingly, motor efficiency and motor output are improved.

In addition, the wiring pattern may be efficiently arranged on the substrate, and the control circuit may be configured compactly. Because a small neutral point only needs to be provided in the inner region, it may be efficiently disposed in the center of the substrate.

A heat dissipation portion formed in a beta pattern may be provided in a predetermined region outside the armature in the radial direction of the substrate.

In response to the small substrate, the region occupied by the control component is relatively enlarged. As the control components become high temperature, the substrate also tends to become high temperature. Because the beta pattern has excellent heat transfer, it is possible to effectively dissipate heat through the beta pattern in response to the high temperature of the substrate. Therefore, even when the control components that become high temperature are concentrated on the small substrate, it is possible to suppress an increase in the temperature of the substrate.

In addition, in the first and second embodiments, two rotors are provided for a single stator, each rotor is disposed on opposite sides of the stator, and one side of the rotor may serve as the fan.

Accordingly, the higher output may be performed, and the number of components may be reduced. Therefore, the structure may be simplified and the size may become compact.

The outer diameter may be 100 mm or less, the height may be 50 mm or less, and the suction power may be 300 W or more.

Accordingly, in both size and performance, it is possible to realize a cleaner being suitable for a stick type cleaner and having excellent operability and convenience.

As is apparent from the above description, it is possible to realize a fan motor capable of exhibiting a high output suitable for a stick type cleaner.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A cleaner comprising:
    a suction portion;
    a body portion provided to communicate with the suction portion; and
    a fan motor accommodated in the body portion, and configured to provide a suction force to the suction portion,
    wherein the fan motor comprises:
        a fan comprising a plurality of blades radially installed, and fixed to a shaft extending in an axial direction;
        a rotor comprising a plurality of magnets and fixed to the shaft; and
        a stator arranged between the rotor and the fan,
    wherein the stator comprises:
        a substrate on which a bearing configured to rotatably support the shaft is provided; and
        a plurality of armatures disposed around the bearing, and
    wherein each of the plurality of armatures comprises:
        an iron core comprising a winding portion; and
        a coil comprising a flat wire comprising a rectangular cross-section with a short side and a long side, the flat wire being wound around the winding portion in such a way that one surface of the flat wire forming the short side is directed to the winding portion,
wherein the flat wire comprises:
a first flat wire element comprising a first element surface forming a short side, and
a second flat wire element provided to be adjacent to the first element surface of the first flat wire element and comprising a second element surface forming a short side.

2. The cleaner of claim 1, wherein the winding portion extends in the axial direction, and the flat wire is wound to form an insertion hole having a size greater than a size of the winding portion to allow the winding portion to be inserted thereto.

3. The cleaner of claim 1, wherein an end of the first flat wire element is spaced apart from an end of the second flat wire element.

4. The cleaner of claim 3, wherein a length of the first flat wire element is the same as a length of the second flat wire element.

5. The cleaner of claim 1, wherein a length of a long side of a cross-section of the first flat wire element is different from a length of a long side of a cross-section of the second flat wire element.

6. The cleaner of claim 1, further comprising:
a control circuit configured to control energization to the coil and disposed radially outward from an armature, of the plurality of armatures, in the substrate.

7. The cleaner of claim 6, wherein the substrate comprises a wiring pattern configured to electrically connect the coil and the control circuit.

8. The cleaner of claim 1,
wherein the flat wire comprises an outer element line and an inner element line disposed closer to the winding portion than the outer element line, and
wherein one end of the outer element line is connected to one end of the inner element line.

9. The cleaner of claim 8, wherein the one end of the outer element line is directly connected to the one end of the inner element line.

10. The cleaner of claim 8,
wherein the stator comprises a coil group comprising a first coil group composed of a plurality of coils and a second coil group provided to have a phase of a flowing current different from that of the first coil group and composed of a plurality of coils, and
wherein the plurality of coils forming the first coil group comprises:
a first coil comprising one end and the other end; and
a second coil comprising one end connected to the one end of the first coil and the other end connected to the other end of the first coil.

11. The cleaner of claim 10,
wherein the stator further comprises a control component configured to control energization to the coil group, and
wherein the control component is disposed outside an armature, of the plurality of armatures, in a radial direction of the substrate.

12. The cleaner of claim 11, wherein each of the coil groups is connected to the control component through a wiring pattern provided on the substrate.

13. The cleaner of claim 8, further comprising:
a heat dissipation portion formed in a beta pattern and provided outside an armature, of the plurality of armatures, in a radial direction of the substrate.

14. The cleaner of claim 1, wherein the fan comprises a plurality of magnets disposed on a surface opposite to one surface on which the plurality of blades is disposed.

15. The cleaner of claim 3, wherein a resistance of the first flat wire element and the second flat wire element are substantially the same.

16. The cleaner of claim 13, wherein the beta pattern comprises copper foil provided in a region of the substrate separate from control structures.

17. A cleaner comprising:
a suction portion;
a body portion provided to communicate with the suction portion; and
a fan motor accommodated in the body portion, and configured to provide a suction force to the suction portion,
wherein the fan motor comprises:
a fan comprising a plurality of blades radially installed, and fixed to a shaft extending in an axial direction;
a rotor comprising a plurality of magnets and fixed to the shaft; and
a stator arranged between the rotor and the fan,
wherein the stator comprises:
a substrate on which a bearing configured to rotatably support the shaft is provided; and
a plurality of armatures disposed around the bearing,
wherein each of the plurality of armatures comprises:
an iron core comprising a winding portion; and
a coil comprising a flat wire comprising a rectangular cross-section with a short side and a long side, the flat wire being wound around the winding portion in such a way that one surface of the flat wire forming the short side is directed to the winding portion,
wherein the flat wire comprises an outer element line and an inner element line disposed closer to the winding portion than the outer element line, and
wherein one end of the outer element line is connected to one end of the inner element line.

* * * * *